US010824392B2

(12) United States Patent
Kim et al.

(10) Patent No.: US 10,824,392 B2
(45) Date of Patent: Nov. 3, 2020

(54) ELECTRONIC APPARATUS FOR PROCESSING USER UTTERANCE FOR CONTROLLING AN EXTERNAL ELECTRONIC APPARATUS AND CONTROLLING METHOD THEREOF

(71) Applicant: Samsung Electronics Co., Ltd., Suwon-si, Gyeonggi-do (KR)

(72) Inventors: Joo Hwan Kim, Suwon-si (KR); Sun Key Lee, Seongnam-si (KR); Kyung Tae Kim, Hwaseong-si (KR); Jae Yung Yeo, Seongnam-si (KR); Kyoung Gu Woo, Seoul (KR); Jeong Hyeon Yun, Suwon-si (KR); Dong Sun Lim, Seoul (KR); Seong Min Je, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 16/036,112

(22) Filed: Jul. 16, 2018

(65) Prior Publication Data

US 2019/0026073 A1    Jan. 24, 2019

(30) Foreign Application Priority Data

Jul. 21, 2017   (KR) .................. 10-2017-0092590

(51) Int. Cl.
*G06F 3/16*    (2006.01)
*H04M 1/725*   (2006.01)
(Continued)

(52) U.S. Cl.
CPC ............ *G06F 3/167* (2013.01); *G06F 1/1605* (2013.01); *G06F 1/1643* (2013.01);
(Continued)

(58) Field of Classification Search
CPC ...... G06F 3/167; G06F 1/1605; G06F 1/1643; G06F 3/0412; G10L 15/22; H04M 1/72533; H04R 1/083; H04R 27/00
See application file for complete search history.

(56) References Cited

U.S. PATENT DOCUMENTS 7,957,974 B2     6/2011  Cho et al.
8,849,652 B2 *   9/2014  Weider .................... G10L 15/22
                                                       704/9
(Continued)

FOREIGN PATENT DOCUMENTS

EP           1933499 A1 *  6/2008   ........... H04L 41/082
JP        2000-056944 A    2/2000
(Continued)

OTHER PUBLICATIONS

International Search Report dated Nov. 6, 2018, issued in a counterpart an International application No. PCT/KR2018/008034.
(Continued)

*Primary Examiner* — Mohammad K Islam
(74) *Attorney, Agent, or Firm* — Jefferson IP Law, LLP

(57) ABSTRACT

An electronic apparatus is provided. The electronic device includes a housing, a touch screen display disposed inside the housing and exposed through a first portion of the housing, a microphone disposed inside the housing and exposed through a second portion of the housing, a communication circuit disposed inside the housing, a processor disposed inside the housing and electrically connected to the touch screen display, the microphone, and the communication circuit, and a memory disposed in the housing and electrically connected with the processor.

20 Claims, 26 Drawing Sheets

(51) Int. Cl.
  *H04R 27/00* (2006.01)
  *G06F 1/16* (2006.01)
  *G06F 3/041* (2006.01)
  *G10L 15/22* (2006.01)
  *H04R 1/08* (2006.01)
  *G06N 20/10* (2019.01)
  *G06N 5/04* (2006.01)
  *G06N 3/08* (2006.01)

(52) U.S. Cl.
  CPC ............ *G06F 3/0412* (2013.01); *G10L 15/22* (2013.01); *H04M 1/72533* (2013.01); *H04R 1/083* (2013.01); *H04R 27/00* (2013.01); *G06N 3/08* (2013.01); *G06N 5/046* (2013.01); *G06N 20/10* (2019.01); *H04R 2227/003* (2013.01)

(56) References Cited

U.S. PATENT DOCUMENTS

| | | | |
|---|---|---|---|
| 8,995,981 B1* | 3/2015 | Aginsky | G08C 17/02 455/419 |
| 9,305,554 B2 | 4/2016 | Jagatheesan et al. | |
| 9,345,054 B1* | 5/2016 | Lu | H04M 1/72533 |
| 9,443,527 B1* | 9/2016 | Watanabe | G10L 15/22 |
| 9,575,720 B2 | 2/2017 | Faaborg et al. | |
| 9,836,276 B2 | 12/2017 | Lu | |
| 9,978,260 B2 | 5/2018 | Lee et al. | |
| 9,990,129 B2* | 6/2018 | Yang | G06F 3/0488 |
| 10,237,237 B2* | 3/2019 | Dawes | H04L 67/10 |
| 10,410,630 B2* | 9/2019 | Weng | G06F 21/32 |
| 2003/0187659 A1 | 10/2003 | Cho et al. | |
| 2004/0210647 A1* | 10/2004 | Jin | H04L 12/2803 709/220 |
| 2009/0313026 A1* | 12/2009 | Coffman | G06F 16/957 704/275 |
| 2012/0130513 A1* | 5/2012 | Hao | G05B 15/02 700/90 |
| 2014/0135952 A1* | 5/2014 | Maehara | G05B 15/02 700/90 |
| 2014/0167931 A1 | 6/2014 | Lee et al. | |
| 2014/0324410 A1* | 10/2014 | Mathews | G09B 25/00 703/22 |
| 2014/0359524 A1 | 12/2014 | Sasaki et al. | |
| 2015/0025890 A1 | 1/2015 | Jagatheesan et al. | |
| 2015/0040012 A1 | 2/2015 | Faaborg et al. | |
| 2015/0154976 A1 | 6/2015 | Mutagi | |
| 2015/0213355 A1 | 7/2015 | Sharma et al. | |
| 2015/0256620 A1* | 9/2015 | Sugano | H04L 67/1095 709/217 |
| 2015/0278678 A1 | 10/2015 | Sharma et al. | |
| 2015/0278679 A1 | 10/2015 | Sharma et al. | |
| 2016/0269904 A1 | 9/2016 | Sharma et al. | |
| 2016/0283191 A1 | 9/2016 | Lu | |
| 2016/0344569 A1* | 11/2016 | Chun | G06F 3/04842 |
| 2017/0024378 A1 | 1/2017 | Sharma et al. | |
| 2017/0105095 A1* | 4/2017 | Um | H04W 4/80 |
| 2017/0116986 A1* | 4/2017 | Weng | G10L 15/22 |
| 2017/0116990 A1 | 4/2017 | Faaborg et al. | |
| 2017/0206896 A1 | 7/2017 | Ko et al. | |
| 2018/0013815 A1* | 1/2018 | Gold | H04L 67/025 |
| 2018/0307682 A1 | 10/2018 | Sharma et al. | |
| 2019/0058783 A1* | 2/2019 | Reid | H04M 1/2535 |
| 2019/0215184 A1* | 7/2019 | Emigh | H04L 12/282 |
| 2019/0318002 A1 | 10/2019 | Sharma et al. | |
| 2020/0007356 A1* | 1/2020 | Mason | H05B 47/155 |
| 2020/0028734 A1* | 1/2020 | Emigh | H04L 67/125 |

FOREIGN PATENT DOCUMENTS

| | | | | |
|---|---|---|---|---|
| JP | 2005-266192 A | 9/2005 | | |
| KR | 10-2003-0075020 A | 9/2003 | | |
| KR | 10-2014-0079328 A | 6/2014 | | |
| KR | 10-2016-0039244 A | 4/2016 | | |
| WO | WO-9859282 A2 * | 12/1998 | ......... | H04L 12/2805 |

OTHER PUBLICATIONS

Extended European Search Report dated Jun. 4, 2020, issued in European Patent Application No. 18834490.7-1203.

* cited by examiner

ELECTRONIC APPARATUS FOR PROCESSING USER UTTERANCE FOR CONTROLLING AN EXTERNAL ELECTRONIC APPARATUS AND CONTROLLING METHOD THEREOF

CROSS-REFERENCE TO RELATED APPLICATION(S)

This application is based on and claims priority under 35 U.S.C. § 119(a) of a Korean patent application number 10-2017-0092590, filed on Jul. 21, 2017, in the Korean Intellectual Property Office, the disclosure of which is incorporated by reference herein its entirety.

BACKGROUND

1. Field

The disclosure relates to a technology for processing a user's utterance.

2. Description of Related Art

In addition to an input scheme using a keyboard or a mouse, electronic apparatuses have recently supported various input schemes such as a voice input and the like. The speech recognition service provided by an electronic apparatus is being developed based on natural language processing. The technology for processing the natural language refers to a technology that determines the intent of the user utterance and generates the result matched with the intent to provide the user with the result.

In addition, the recent electronic apparatus may control another electronic apparatus through the environment of an Internet of things (IoT) implemented over a communication network. The user may remotely control the device, which is accessed to the communication network, through the electronic apparatus. For example, the user may remotely control the refrigerator, a television (TV), an air conditioner, or the like through the smartphone.

The above information is presented as background information only to assist with an understanding of the disclosure. No determination has been made, and no assertion is made, as to whether any of the above might be applicable as prior art with regard to the disclosure.

SUMMARY

Since a speech recognition service displays only the result according to a user input, the speech recognition service may process only the user's voice, such as executing the program or entering a value. Accordingly, it is difficult to process a user input to execute a plurality of applications. In addition, since the speech recognition service receives a user input to control only the operation of the electronic apparatus receiving the user input or another electronic apparatus connected through a communication network, it may be difficult to process the user input for controlling the operations of a plurality of electronic apparatuses. In other words, the speech recognition service may process only the restricted user input, as compared with a user interface.

Additional aspects will be set forth in part in the description which follows and, in part, will be apparent from the description, or may be learned by practice of the presented embodiments.

Aspects of the disclosure are to address at least the above-mentioned problems and/or disadvantages and to provide at least the advantages described below. Accordingly, an aspect of the disclosure is to provide a method of organically controlling the operations of a plurality of electronic apparatuses to process a task corresponding to a user input.

In accordance with an aspect of the disclosure, an electronic apparatus is provided. The electronic device includes a housing, a touch screen display positioned inside the housing and exposed through a first portion of the housing, a microphone positioned inside the housing and exposed through a second portion of the housing, a communication circuit positioned inside the housing, at least one processor positioned inside the housing and electrically connected to the touch screen display, the microphone, and the communication circuit, and a memory positioned in the housing and electrically connected with the at least one processor. The memory may store an instruction that, when executed, causes the at least one processor to receive a user input through at least one of the touch screen display or the microphone, transmit first data associated with the user input to an external server through the communication circuit, receive a response including information about a first sequence of states of the first external electronic apparatus and a second sequence of states of the second external electronic apparatus, from the external server through the communication circuit, transmit a first command that allows the first external electronic apparatus to have the first sequence of states to the first external electronic apparatus, and transmit a second command that allows the second external electronic apparatus to have the second sequence of states to the second external electronic apparatus. The user input may include a request for performing at least one task by using a first external electronic apparatus and a second external electronic apparatus.

In accordance with another aspect of the disclosure, the first command includes the first sequence of states, and the second command includes the second sequence of states.

In accordance with another aspect of the disclosure, the memory may store an instruction that, when executed, causes the at least one processor to obtain second data by allowing the first external electronic apparatus to have the first sequence of states based on the first command, and when the second external electronic apparatus performs an operation based on the second sequence of states, transmit the second data together with the second command to the second external electronic apparatus to use the second data based on the second command.

In accordance with another aspect of the disclosure, when the first external electronic apparatus and the second external electronic apparatus are included in a local network, the first command may allow the first external electronic apparatus to directly transmit the second data to the second external electronic apparatus.

In accordance with another aspect of the disclosure, the memory may store an instruction that, when executed, causes the at least one processor to display the first sequence of states and the second sequence of states, which respectively operate based on the first command and the second command, in the touch screen display.

In accordance with another aspect of the disclosure, the memory may store an instruction that, when executed, causes the at least one processor, when the first external electronic apparatus and the second external electronic apparatus complete an operation based on the first sequence of states and the second sequence of states, receive second information indicating that the operation has been completed from the first external electronic apparatus and the second external electronic apparatus.

In accordance with another aspect of the disclosure, the response may include information about a state for verifying that the operation has been completed.

In accordance with another aspect of the disclosure, the memory may store an instruction that, when executed, causes the at least one processor to determine whether a first operation of the second external electronic apparatus based on the second sequence of states based on a second operation of the first external electronic apparatus that based on the first sequence of states, and, when the first operation is dependent on the second operation, transmit the second command to the second external electronic apparatus after verifying that the second operation is completed.

In accordance with another aspect of the disclosure, a system processing a user utterance may include a network interface, at least one at least one processor operatively connected to the network interface, and at least one memory operatively connected to the processor. The at least one memory may store an instruction that, when executed, causes the at least one processor to receive first data associated with a user input obtained through a microphone, from a first external electronic apparatus including the microphone through the network interface, determine a first sequence of states for the second external electronic apparatus and a second sequence of states for the third external electronic apparatus for performing the at least one task, and transmit a response including information about the first sequence of states and the second sequence of states to the first external electronic apparatus or an external server controlling the second external electronic apparatus and the third external electronic apparatus. The user input may include a request for performing at least one task by using a second external electronic apparatus and a third external electronic apparatus. The information includes a first command for having the first sequence of states and a second command for having the second sequence of states.

In accordance with another aspect of the disclosure, the first command includes the first sequence of the states, and the second command includes the second sequence of the states.

In accordance with another aspect of the disclosure, the information includes a data packet including a header and a field indicating a plurality of commands.

In accordance with another aspect of the disclosure, the first sequence of states and the second sequence of states are provided in a JavaScript object notation (JSON) format.

In accordance with another aspect of the disclosure, the information includes a relationship between the first command and the second command.

In accordance with another aspect of the disclosure, the first command may include a first device type associated with the second external electronic apparatus and a second device type associated with the third external electronic apparatus.

In accordance with another aspect of the disclosure, the at least one memory may store an instruction that, when executed, causes the at least one processor, when the first external electronic apparatus and one of the second external electronic apparatus or the third external electronic apparatus are not included in a local network, transmit the information to the external server.

In accordance with another aspect of the disclosure, the first command allows the second external electronic apparatus to have the second sequence of states to generate and transmit second data and to the third external electronic apparatus, and the third external electronic apparatus performs an operation based on the second sequence of states using the second data.

In accordance with another aspect of the disclosure, when the second external electronic apparatus and the third external electronic apparatus are included in a local network, the first command may allow the first external electronic apparatus to directly transmit the second data to the third external electronic apparatus.

In accordance with another aspect of the disclosure, a system processing a user utterance may include a network interface, at least one processor operatively connected to the network interface, and at least one memory operatively connected to the at least one processor. The at least one memory may store an instruction that, when executed, causes the at least one processor to connect to a first Internet of things (IoT) device and a second IoT device through the network interface, receive information about a first sequence of states of the first IoT device and a second sequence of states of the second IoT device, for performing at least one task, from an external server through the network interface, provide the first command to the first IoT device based at least partly on the first sequence of states, and provide the second command to the second IoT device based at least partly on the second sequence of states, receive information about at least one state from at least one of the first IoT device and the second IoT device, and after receiving an update of the at least one state, transmit the update of the at least one state to at least one of the external server and an external portable device through the network interface. The information may include a first command for the first IoT device and a second command for the second IoT device.

In accordance with another aspect of the disclosure, the at least one memory may store an instruction that, when executed, causes the at least one processor to provide the first command to the first IoT device, after providing the first command, receive a first state update from the first IoT device, after receiving the first state update, provide the second command to the second IoT device, and after providing the second command, receive a second state update from the second IoT device.

In accordance with another aspect of the disclosure, the first command may include the first sequence of the states, and the second command may include the second sequence of the states.

According to various embodiments of the present disclosure, a user terminal may receive a path rule in which the states of a user terminal or an external electronic apparatus are sequentially listed, through an intelligent server and may perform the operation of an app stored in a memory or an electronic apparatus depending on the received path rule to perform a task corresponding to a user input.

In addition, in the case where the user terminal receives a user input for performing the operations of a plurality of electronic apparatuses, the user terminal may determine whether the operations of the plurality of electronic apparatuses are dependent on each other, through an intelligent server, may determine the subject controlling the operations of the plurality of electronic apparatuses, may determine a method of transmitting and/or receiving data between the plurality of electronic apparatuses, and may organically control the operations of the plurality of electronic apparatuses for processing a user input.

A variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Prior to describing an embodiment of the disclosure, an integrated intelligent system to which an embodiment of the disclosure is capable of being applied will be described.

Figure 1:
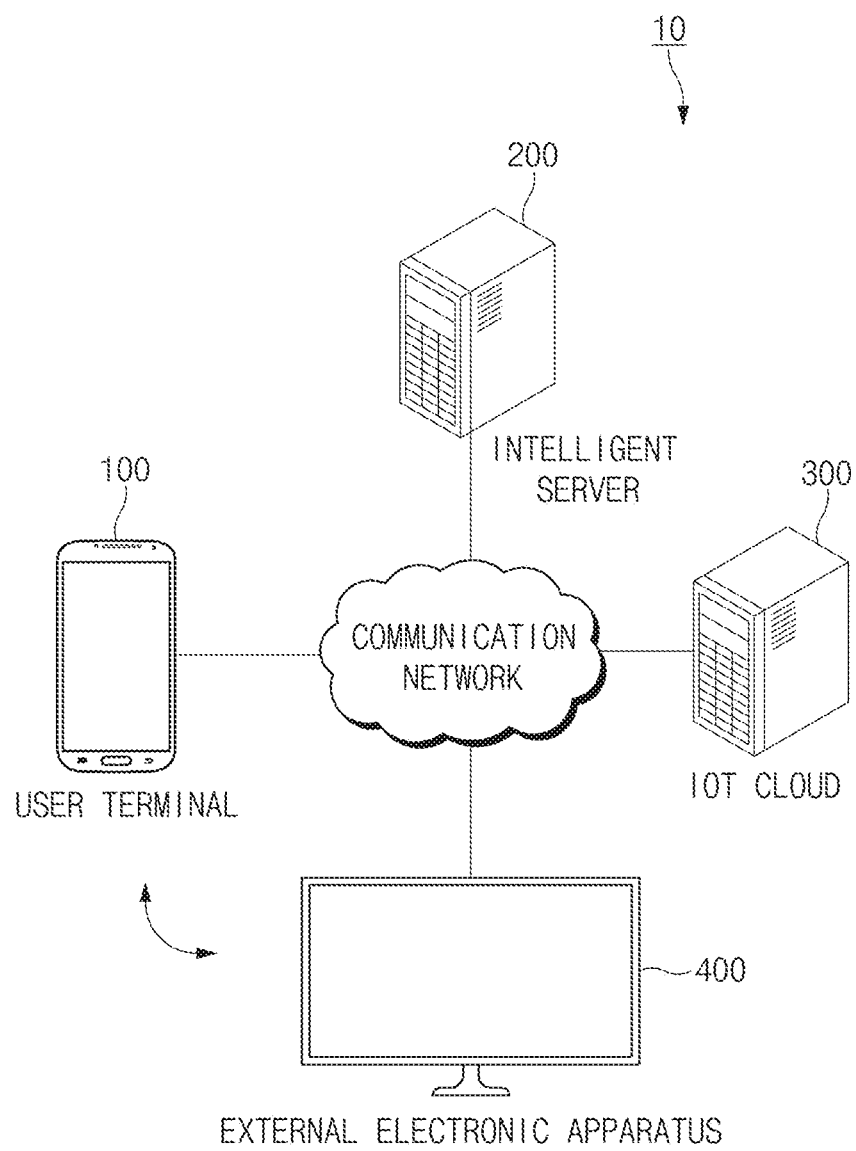
FIG. 1 is a view illustrating an integrated intelligent system according to various embodiments of the disclosure.

FIG. 1 is a view illustrating an integrated intelligent system according to various embodiments of the disclosure.

Figure 21:
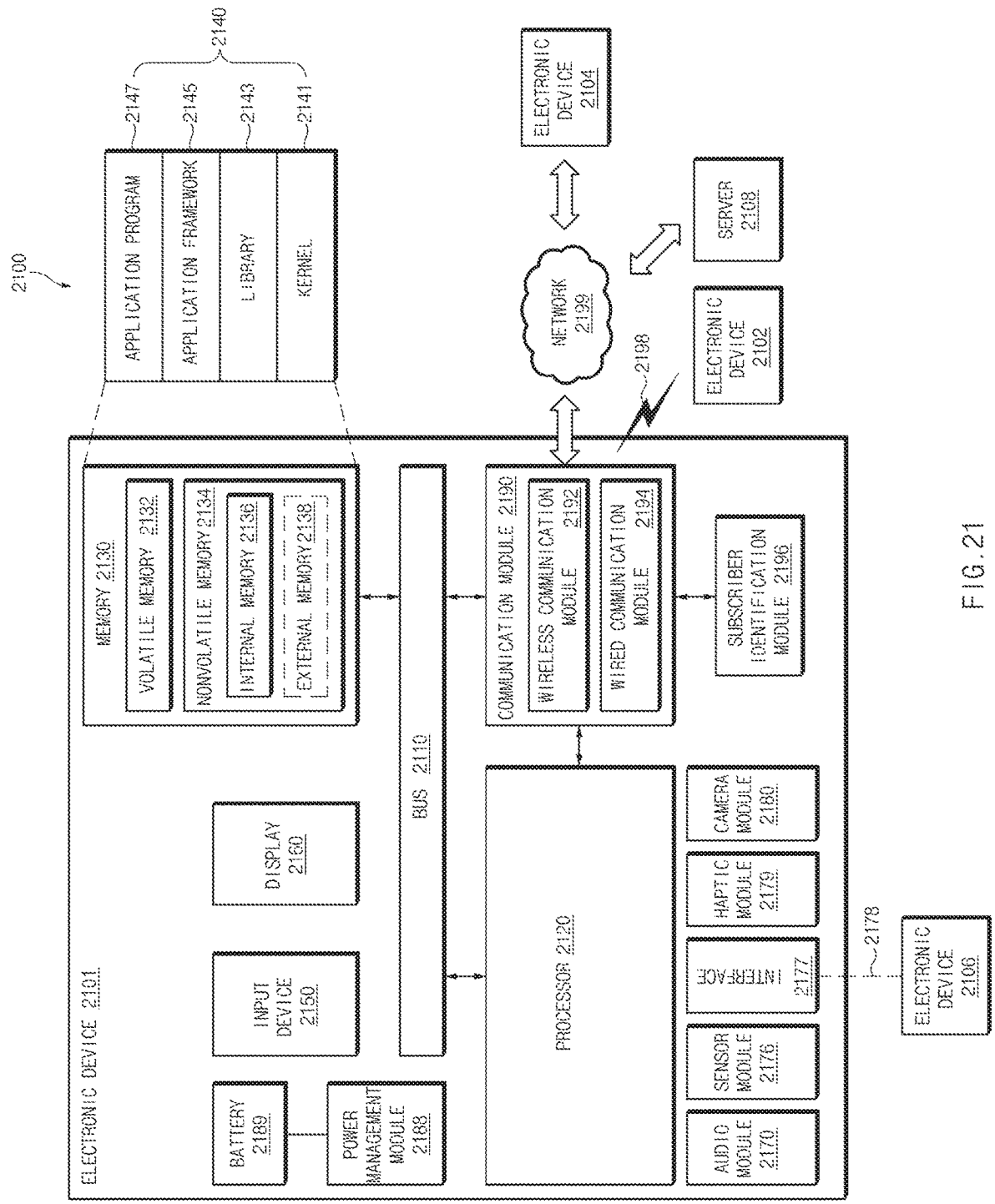
FIG. 21 illustrates a block diagram of an electronic apparatus in a network environment according to various embodiments of the disclosure.

Referring to FIG. 1, an integrated intelligent system 10 may include a user terminal 100 (or electronic apparatus) (e.g., an electronic apparatus 2101 of FIG. 21), an intelligent server 200, an Internet of thing (IoT) cloud 300 (e.g., a server 2108 of FIG. 21), or an external electronic apparatus (or IoT device) 400 (e.g., electronic apparatus 2104 of FIG. 21).

According to an embodiment, the user terminal 100 may receive the user input. For example, the user terminal 100 may receive a user utterance through a microphone. According to an embodiment, the user terminal 100 may receive a user input by using an app (or application program) stored therein. For example, the user terminal 100 may receive a user utterance by using an intelligent app (e.g., speech recognition app). According to an embodiment, the user terminal 100 may execute an operation of the internally stored app or the external electronic apparatus 400, based on a user input. In other words, the user terminal 100 may include a request for performing at least one task using the external electronic apparatus 400.

According to an embodiment, various types of terminal devices (or an electronic apparatus), which are connected with Internet, such as a mobile phone, a smartphone, personal digital assistant (PDA), a notebook computer, and the like may correspond to the user terminal 100.

According to an embodiment, the intelligent server 200 may receive a user input over a communication network to generate (or select) a path rule. For example, the path rule may include information about an action (or operation) for performing the function of at least one of the user terminal 100 and the external electronic apparatus 400. In addition, the path rule may further include information (or data) about parameters necessary to execute the action. According to an embodiment, for the purpose of performing a task corresponding to a user input, the intelligent server 200 may sequentially arrange a plurality of actions to generate a path rule. The user terminal 100 may receive the path rule and may perform the operation of the app or the external electronic apparatus 400 depending on the path rule.

Generally, the term "path rule" of the disclosure may mean, but not limited to, the sequence of states of an electronic apparatus, which allows the electronic apparatus to perform the task requested by the user. In other words, the path rule may include information about the sequence of the states of electronic apparatuses. For example, the task may be an action that the intelligent app is capable of providing. The task may include the generation of a schedule, the transmission of a picture to a desired opponent, or the provision of weather information. The user terminal 100 may perform the task by sequentially having at least one or more states (e.g., an operating state of the user terminal 100).

According to an embodiment, the path rule may be provided or generated by an artificial intelligent (AI) system. The artificial intelligent system may be a rule-based system, or may be a neural network-based system (e.g., a feedforward neural network (FNN) or a recurrent neural network (RNN)). Alternatively, the artificial intelligent system may be a combination of the above-described systems or an artificial intelligent system different from the above-described system. According to an embodiment, the path rule may be selected from a set of predefined path rules or may be generated in real time in response to a user request. For example, the artificial intelligent system may select at least a path rule of predefined plurality of path rules, or may generate a path rule dynamically (or in real time). Furthermore, the user terminal 100 may use a hybrid system to provide the path rule.

According to an embodiment, the IoT cloud 300 may receive the path rule from the intelligent server 200 over the communication network. The IoT cloud 300 may operate the external electronic apparatus 400 depending on the received path rule. According to an embodiment, the IoT cloud 300 may control the operation of an electronic apparatus (e.g., the user terminal 100 and the external electronic apparatus 400) included in the path rule, instead of the user terminal 100. For example, the IoT cloud 300 may control the operation of an electronic apparatus depending on the states of a plurality of electronic apparatuses (e.g., the user terminal 100 and the external electronic apparatus 400) and a network environment, in which the plurality of electronic apparatuses are included, instead of the user terminal 100.

According to an embodiment, the IoT cloud 300 may receive data generated by the execution of the operation, from the user terminal 100 or the external electronic apparatus 400. The user terminal 100 or the external electronic apparatus 400 may execute the operation of an app depending on the path rule and may transmit the data generated by the operation to the IoT cloud 300. According to an embodiment, the IoT cloud 300 may store the generated data in a database and may transmit information about an address of a location, at which the data is stored, to the user terminal 100 or the external electronic apparatus 400. When performing an operation requiring the data, the external electronic apparatus 400 may obtain the data from the IoT cloud 300 by using the information about the address.

According to an embodiment, the external electronic apparatus 400 may receive a command from the user terminal 100 or the IoT cloud 300 to execute an operation. The user terminal 100 or the IoT cloud 300 may transmit a command for performing an operation depending on the received path rule, to the external electronic apparatus 400. For example, the external electronic apparatus 400 may perform an operation depending on the path rule included in the received command According to an embodiment, the external electronic apparatus 400 may perform the operation included in the path rule by using the data. For example, the data may be included in the command received from the user terminal 100 or may be obtained from the IoT cloud 300.

According to an embodiment, the path rule generated by the intelligent server 200 may include operations of a plurality of electronic apparatuses. For example, the path rule may include the operations of the plurality of electronic apparatuses including the user terminal 100 and the external electronic apparatus 400. The user terminal 100 or the IoT cloud 300 may perform the operations of the plurality of electronic apparatuses based on the path rule. The operations of the plurality of electronic apparatuses may be independent of each other or may be dependent on each other.

According to an embodiment, the integrated intelligent system 10 may further include a router (or hub). When being not connected to a server, the external electronic apparatus 400 may be connected to the IoT cloud 300 through the router.

Figure 2:
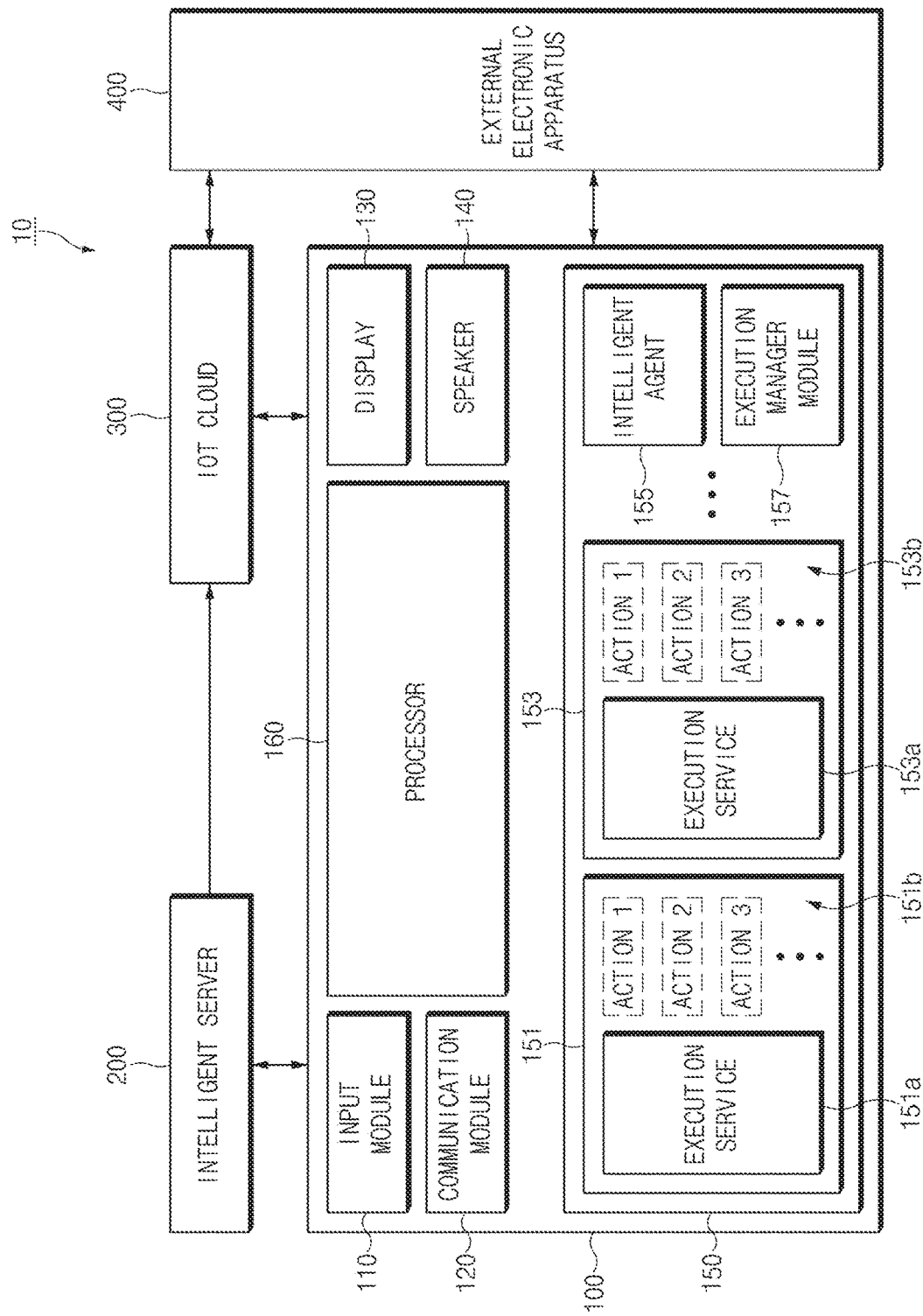
FIG. 2 is a block diagram illustrating a user terminal of an integrated intelligent system according to an embodiment of the disclosure.

FIG. 2 is a block diagram illustrating a user terminal of an integrated intelligent system according to an embodiment of the disclosure.

Referring to FIG. 2, the user terminal (or an electronic apparatus) 100 may include an input module 110 (e.g., an input device 2150 of FIG. 21), a communication module (or communication circuit) 120, a display 130, a speaker 140, a memory 150 (e.g., a memory 2130 of FIG. 21), or a processor 160 (e.g., a processor 2120 of FIG. 21). The user terminal 100 may further include a housing (not illustrated), and components of the user terminal 100 may be positioned inside the housing.

According to an embodiment, the input module 110 may receive a user input from a user. For example, the input module 110 may receive the user input from the connected external apparatus (e.g., a keyboard or a headset). For another example, the input module 110 may include a touch screen (e.g., a touch screen display) coupled to the display 130. For another example, the input module 110 may include a hardware key (e.g., a hardware key 113 of FIG. 4A) positioned at the user terminal 100.

Figure 4A:
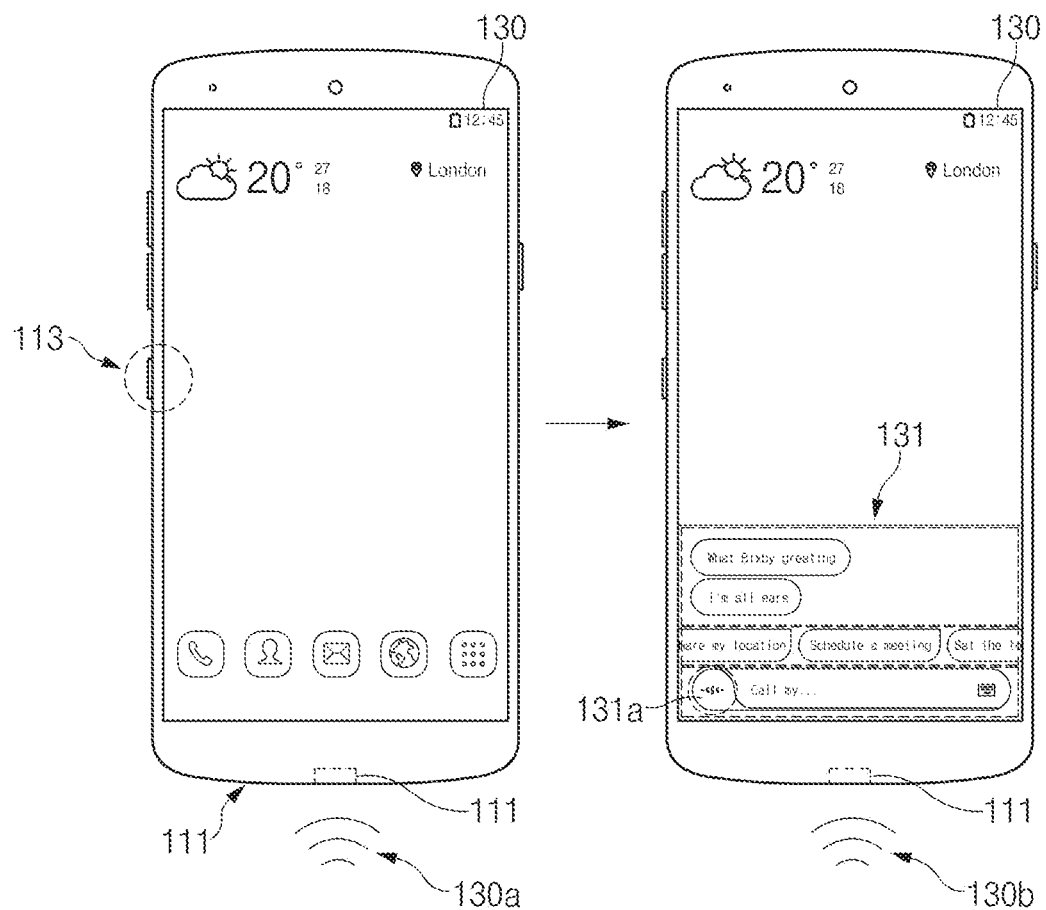
FIG. 4A is a view illustrating that an intelligent app of a user terminal is executed according to an embodiment of the disclosure.

According to an embodiment, the input module 110 may include a microphone (e.g., a microphone 111 of FIG. 4A)

that is capable of receiving user utterance as a voice signal. For example, the input module 110 may include a speech input system and may receive the utterance of the user as a voice signal through the speech input system. For example, the microphone may be exposed through a part (e.g., a first portion) of the housing.

According to an embodiment, the communication module (or communication circuit) 120 may be connected to an external electronic apparatus to transmit and/or receive a signal. For example, the communication module 120 may include a wireless communication module (e.g., Bluetooth, Wi-Fi, or the like). For example, the communication module 120 may be connected to the intelligent server 200, the IoT cloud 300, and the external electronic apparatus 400 to transmit and/or receive a signal (e.g., a user input and a path rule corresponding to the user input).

According to an embodiment, the display (or touch screen display) 130 may display an image or a video image. For example, the display 130 may display the execution screen of an app. The screen displayed in the display 130 may include a graphic user interface (GUI). According to an embodiment, the display 130 may be exposed through one portion (e.g., a second portion) of the housing to the outside of the user terminal 100.

According to an embodiment, the speaker 140 may output the voice signal. For example, the speaker 140 may output the voice signal generated in the user terminal 100 to the outside. According to an embodiment, the speaker 140 may be exposed to one portion (e.g., a third portion) of the housing.

According to an embodiment, the memory 150 may store a plurality of apps (e.g., application program) 151 and 153. For example, the plurality of apps 151 and 153 may be a program for performing a function corresponding to the user input. The plurality of apps 151 and 153 may include execution services 151a and 153a or a plurality of actions (or unit actions) 151b and 153b. After the plurality of apps 151 and 153 may be loaded by the processor 160, the execution services 151a and 153a may be generated, and the plurality of actions 151b and 153b may be executed through the execution services 151a and 153a.

According to an embodiment, the memory 150 may store an intelligent agent 155 or an execution manager module 157. For example, the intelligent agent 155 and the execution manager module 157 may be a framework (or application framework) for processing the received user input (e.g., user utterance). According to an embodiment, the intelligent agent 155 and the execution manager module 157 stored in the memory 150 may be performed by the processor 160. The function of each of the intelligent agent 155 or the execution manager module 157 may be implemented by the processor 160. It is described that the function of each of the intelligent agent 155 or the execution manager module 157 is the operation of the processor 160. According to an embodiment, the intelligent agent 155 or the execution manager module 157 stored in the memory 150 may be implemented with hardware as well as software.

Figure 3:
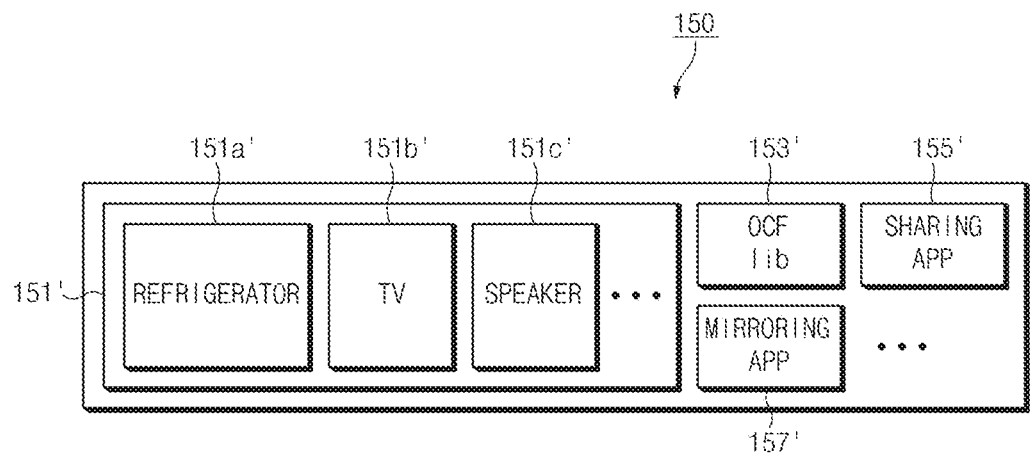
FIG. 3 is a diagram illustrating a program stored in a memory of a user terminal according to an embodiment of the disclosure.

FIG. 3 is a diagram illustrating a program stored in a memory of a user terminal according to an embodiment of the disclosure.

Referring to FIG. 3, the memory 150 may include a plurality of programs (or apps) 151', 153', 155', and 157' for performing the function of the user terminal 100. For example, the program stored in the memory 150 may be similar to the plurality of apps 151 and 153 stored in the memory 150 of FIG. 2. In other words, the program stored in the memory 150 may include the plurality of actions 151b and 153b for performing the specified function of the user terminal 100.

According to an embodiment, the memory 150 may include the dedicated app 151' for directly controlling the external electronic apparatus 400. For example, the memory 150 may include the dedicated app 151' including a framework for controlling the external electronic apparatus 400. For example, the framework may include information (e.g., information 151a' about a refrigerator, information 151b' about a display device, or information 151c' about a speaker device) for controlling each of a plurality of electronic apparatuses. The information for controlling each of the plurality of electronic apparatuses may include a library and a user interface (UI) of an electronic apparatus. The user terminal 100 may indicate a state of the external electronic apparatus 400 through the UI and may control the external electronic apparatus 400.

According to an embodiment, the memory 150 may include the program 153' for controlling the external electronic apparatus 400 over a network (e.g., Internet). For example, the program 153' for controlling the external electronic apparatus 400 over a communication network may include a library (e.g., an open connectivity foundation (OCF) library (OCF Lib) (or open interconnect consortium (OIC) framework) for the IoT environment) for controlling the external electronic apparatus 400 connected to a network. The OCF library may include a discovery function, a messaging function, resource management function, a request and response function (e.g., create, retrieve, update, delete, and notify (CRUDN)), a device management function, an identifier (ID)/address function, and a security function for controlling the external electronic apparatus 400. In other words, the plurality of functions may be implemented in the OCF library.

According to an embodiment, the memory 150 may include the app (or sharing app) 155' that shares data with the external electronic apparatus 400. For example, the app 155' sharing data with the external electronic apparatus 400 may transmit the data from the user terminal 100 to the external electronic apparatus 400.

According to an embodiment, the memory 150 may include the app (or mirroring app) 157' that displays the screen of the user terminal 100 in the external electronic apparatus 400. For example, the app 157' displaying the screen of the user terminal 100 in the external electronic apparatus 400 may transmit an image (or video image), which is displayed in the display 130 of the user terminal 100, in the streaming manner to display the image in the external electronic apparatus 400.

According to an embodiment, the memory 150 may store an intelligent app (not illustrated) operating in conjunction with the intelligent agent 155. For example, the app operating in conjunction with the intelligent agent 155 may be a speech recognition app and may receive a user's utterance to process the user's utterance as a voice signal. The app operating in conjunction with the intelligent agent 155 may be operated by a specified input (e.g., an input through a hardware key, an input through a touch screen, or a specific voice input) entered through the input module 110.

Referring to FIG. 2, the processor 160 may control overall operations of the user terminal 100. The processor 160 may be electrically connected to the input module 110, the communication module 120, the display 130, the speaker 140, and the memory 150. For example, the processor 160 may control the input module 110 to receive the user input. The processor 160 may control the communication module 120 to be accessed to an external electronic apparatus and may transmit and/or receive data to and/or from the external electronic apparatus. The processor 160 may control the display 130 to display an image. The processor 160 may control the speaker 140 to output the voice signal. The processor 160 may control the memory 150 to execute a program and to read or store necessary information. According to an embodiment, the processor 160 may perform an operation to be described below, when the instruction stored in the memory 150 is executed.

According to an embodiment, the processor 160 may execute the intelligent agent 155 or the execution manager module 157 stored in the memory 150. As such, the processor 160 may implement the function of the intelligent agent 155 or the execution manager module 157.

According to an embodiment, the processor 160 may execute the intelligent agent 155 to receive a user input through the input module 110. For example, the processor 160 may execute the intelligent agent 155 to receive a user utterance as a user input through a microphone included in the input module 110. For example, the user input may include a request preforming at least one task using the external electronic apparatus 400. According to an embodiment, the intelligent agent 155 may include a speech recognition module that receives a user input. For example, the intelligent agent 155 may recognize a user input through the speech recognition module. For example, the speech recognition module may include at least one of a hidden Markov model (HMM) algorithm, an artificial neural network (ANN) algorithm, and a dynamic time warping (DTW) algorithm for recognizing a voice.

According to an embodiment, the processor 160 may execute the intelligent agent 155 by a specified user input. For example, the processor 160 may execute a wake-up recognition module stored in the memory 150 to recognize the specified user input and may execute the intelligent agent 155. For example, the wake-up recognition module may be implemented with a low-power processor (e.g., a processor included in an audio codec). According to another embodiment, the processor 160 may execute the intelligent agent 155, in response to a specified user input received through a hardware key. According to an embodiment, in the case where the intelligent agent 155 is executed, an intelligent app (e.g., a speech recognition app) operating in conjunction with the intelligent agent 155 may be executed.

According to an embodiment, the processor 160 may execute the intelligent agent 155 to receive a user input for executing apps 151 and 153 (or the programs 151', 153', 155', and 157') stored in the memory 150 and the operation of the external electronic apparatus 400. According to an embodiment, the processor 160 may execute the intelligent agent 155 to perform pre-processing on the received user input. For example, for the purpose of pre-processing on a user utterance, the intelligent agent 155 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input and may search for a part in which the user voice is present, by using the detected end-point. The AGC module may adjust the volume of the user input to be suitable for recognizing and processing the user input. According to an embodiment, the intelligent agent 155 may include all the pre-processing components for performance. However, in another embodiment, the intelligent agent 155 may include a part of the pre-processing components to operate at low power.

According to an embodiment, the processor 160 may execute the intelligent agent 155 to transmit the user input received through the communication module 120, to the intelligent server 200. In other words, the processor 160 may execute the intelligent agent 155 to transmit data associated with the user input to the intelligent server 200 through the communication module 120. For example, the processor 160 may execute the intelligent agent 155 to transmit a request for receiving a path rule corresponding to the user input to the intelligent server 200. According to an embodiment, the processor 160 may execute the intelligent agent 155 to receive the path rule corresponding to the user input from the intelligent server 200. For example, the processor 160 may execute the intelligent agent 155 to receive a response including the path rule corresponding to the user input.

According to an embodiment, the processor 160 may execute the intelligent agent 155 to execute the operations of the user terminal 100 and the external electronic apparatus 400 depending on the received path rule. In other words, the processor 160 may execute the intelligent agent 155 to execute the operations of a plurality of electronic apparatuses (e.g., the user terminal 100 and the external electronic apparatus 400) depending on the path rule.

According to an embodiment, the processor 160 may execute the intelligent agent 155 to select the apps 151 and 153 stored in the memory 150, depending on the received path rule and may generate a command for executing the actions 151b and 153b included in the selected app. The processor 160 may execute the execution manager module 157 to execute and bind the selected apps 151 and 153 and may receive the generated command from the intelligent agent 155 to execute the operations of the selected apps 151 and 153. The processor 160 may execute the execution manager module 157 to sequentially transmit the actions 151b and 153b included in the path rule, to the apps 151 and 153.

According to an embodiment, the processor 160 may execute the intelligent agent 155 to generate a command for operating the external electronic apparatus 400 depending on the received path rule. The processor 160 may execute the execution manager module 157, may receive the generated command from the intelligent agent 155, and may transmit the generated command to the external electronic apparatus 400. The command may include a path rule including the operation of the external electronic apparatus 400 and information necessary for the operation. For example the information necessary for the operation may include data necessary for the operation or information about an address for obtaining the data necessary for the operation. The external electronic apparatus 400 may obtain the data necessary for the operation from the IoT cloud 300 by using the information about the address.

According to an embodiment, in the case where the processor 160 executes the execution manager module 157 to control the external electronic apparatus 400 over a communication network, the processor 160 may execute the OCF library 153'. The processor 160 may execute the execution manager module 157 to control the operation of the external electronic apparatus 400 by using the functions of the OCF library 153'.

According to an embodiment, in the case where the processor 160 executes the execution manager module 157 to receive a command for directly controlling the operation of the external electronic apparatus 400 from the intelligent agent 155, the processor 160 may execute the dedicated app 151'. The processor 160 may execute the execution manager module 157 to display the operating state of the external electronic apparatus 400 in the UI of the dedicated app 151'. According to an embodiment, the user may control the external electronic apparatus 400 through the dedicated app 151'.

According to an embodiment, the processor 160 may execute the intelligent agent 155 to receive information about the execution state of the operation of the app 151 or 153 or the external electronic apparatus 400. For example, the processor 160 may execute the intelligent agent 155 and may receive information about the execution state of the operation of the external electronic apparatus 400. For another example, the processor 160 may execute the intelligent agent 155 to receive the information about execution states of the operations of the apps 151 and 153, through the execution manager module 157. For example, the information about the execution state of the operation of the app 151 or 153 or the external electronic apparatus 400 may be information of a state in which the execution of the operation of the app 151 or 153 or the external electronic apparatus 400 is completed. For another example, the information about the execution state of the operation of the app 151 or 153 or the external electronic apparatus 400 may be information of a state in which the execution of the operation of the app 151 or 153 or the external electronic apparatus 400 is interrupted. The processor 160 may make a request for an additional input of necessary information (e.g., information about the parameter) to the user by using the execution state of an operation of the app 151 or 153 and the external electronic apparatus 400 through the intelligent agent 155.

According to an embodiment, the processor 160 may execute the execution manager module 157 to transmit information (or data) about a parameter included in the path rule to the apps 151 and 153. In the case where the plurality of apps 151 and 153 are sequentially executed depending on the path rule, the processor 160 may execute the execution manager module 157 to transmit the information about the parameter included in the path rule from one app to another app.

According to an embodiment, the processor 160 may execute the execution manager module 157 to transmit data, which is generated through operations of the apps 151 and 153, to the IoT cloud 300 or the external electronic apparatus 400. For example, the processor 160 may execute the execution manager module 157 to transmit the data, which is generated through operations of the apps 151 and 153, to the IoT cloud 300 and may receive an address, at which the generated data is stored, from the IoT cloud 300. The processor 160 may execute the execution manager module 157 to transmit information about the address to the external electronic apparatus 400, and the external electronic apparatus 400 may obtain the data, which is generated from the user terminal 100, from the IoT cloud 300 by using the information about the address. Alternatively, the processor 160 may execute the execution manager module 157 to transmit data, which is generated through operations of the apps 151 and 153, to the external electronic apparatus 400.

FIG. 4A is a view illustrating that an intelligent app of a user terminal is executed according to an embodiment of the disclosure.

Referring to FIG. 4A, the user terminal 100 receives a user input to execute an intelligent app (e.g., a speech recognition app) operating in conjunction with the intelligent agent 155.

According to an embodiment, the user terminal 100 may execute the intelligent app for recognizing a voice through the hardware key 113. For example, in the case where the user terminal 100 receives the user input through the hardware key 113, the user terminal 100 may display a UI 131 of the intelligent app in the display 130. For example, a user may touch a speech recognition button 131a to the UI 131 of the intelligent app for the purpose of entering a voice 130b in a state where the UI 131 of the intelligent app is displayed in the display 130. For another example, while continuously pressing the hardware key 113 to enter the voice 130b, the user may enter the voice 130b.

According to an embodiment, the user terminal 100 may execute the intelligent app for recognizing a voice through the microphone 111. For example, in the case where a specified voice 130a (e.g., wake up!) is input through the microphone 111, the user terminal 100 may display the UI 131 of the intelligent app in the display 130.

Figure 4B:
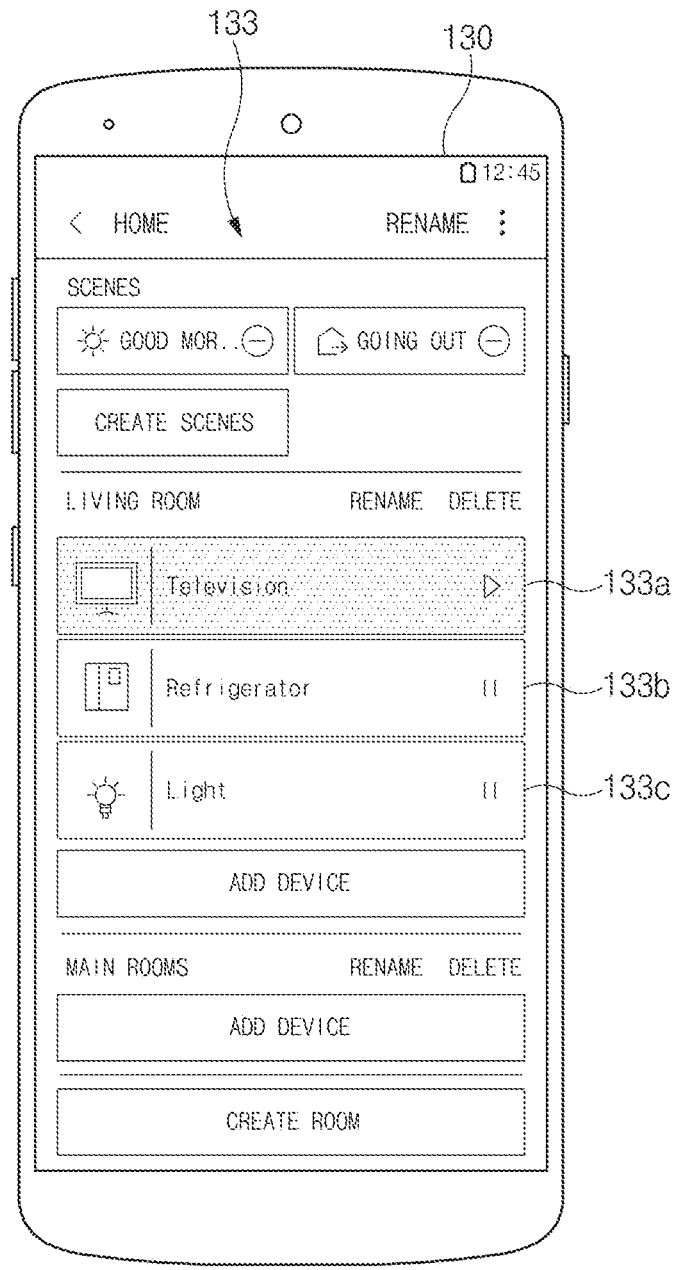
FIG. 4B is a view illustrating a screen in which a dedicated app of a user terminal is executed according to an embodiment of the disclosure.

FIG. 4B is a view illustrating a screen in which a dedicated app of a user terminal is executed according to an embodiment of the disclosure.

Referring to FIG. 4B, the user terminal 100 may execute the dedicated app 151' for controlling the operation of the external electronic apparatus 400. When receiving a user input for executing the dedicated app 151', the user terminal 100 may display a UI 133 of the dedicated app 151' in the display 130. The UI 133 of the dedicated app 151' may include UIs 133a, 133b, and 133c corresponding to the external electronic apparatus 400. The user terminal 100 may display the UIs 133a, 133b, and 133c corresponding to the external electronic apparatus 400 by using the UIs 151a', 151b', and 151c' of a plurality of electronic apparatuses (e.g., a refrigerator, a display device, and a speaker device) included in the dedicated app 151', respectively. The UIs 133a, 133b, and 133c may display the state (e.g., the execution state of the operation) of the external electronic apparatus 400. For example, the user terminal 100 may display an UI (e.g., the UI 133a of a refrigerator) corresponding to the external electronic apparatus 400 executing an operation so as to distinguish from a UI (e.g., the UI 133b of a display device or the UI 133c of a speaker device) corresponding to an external electronic apparatus that does not execute an operation. In addition, the user terminal 100 may display information about an operation executed by the external electronic apparatus 400, in the UIs 133a, 133b, and 133c corresponding to the external electronic apparatus 400.

Figure 5:
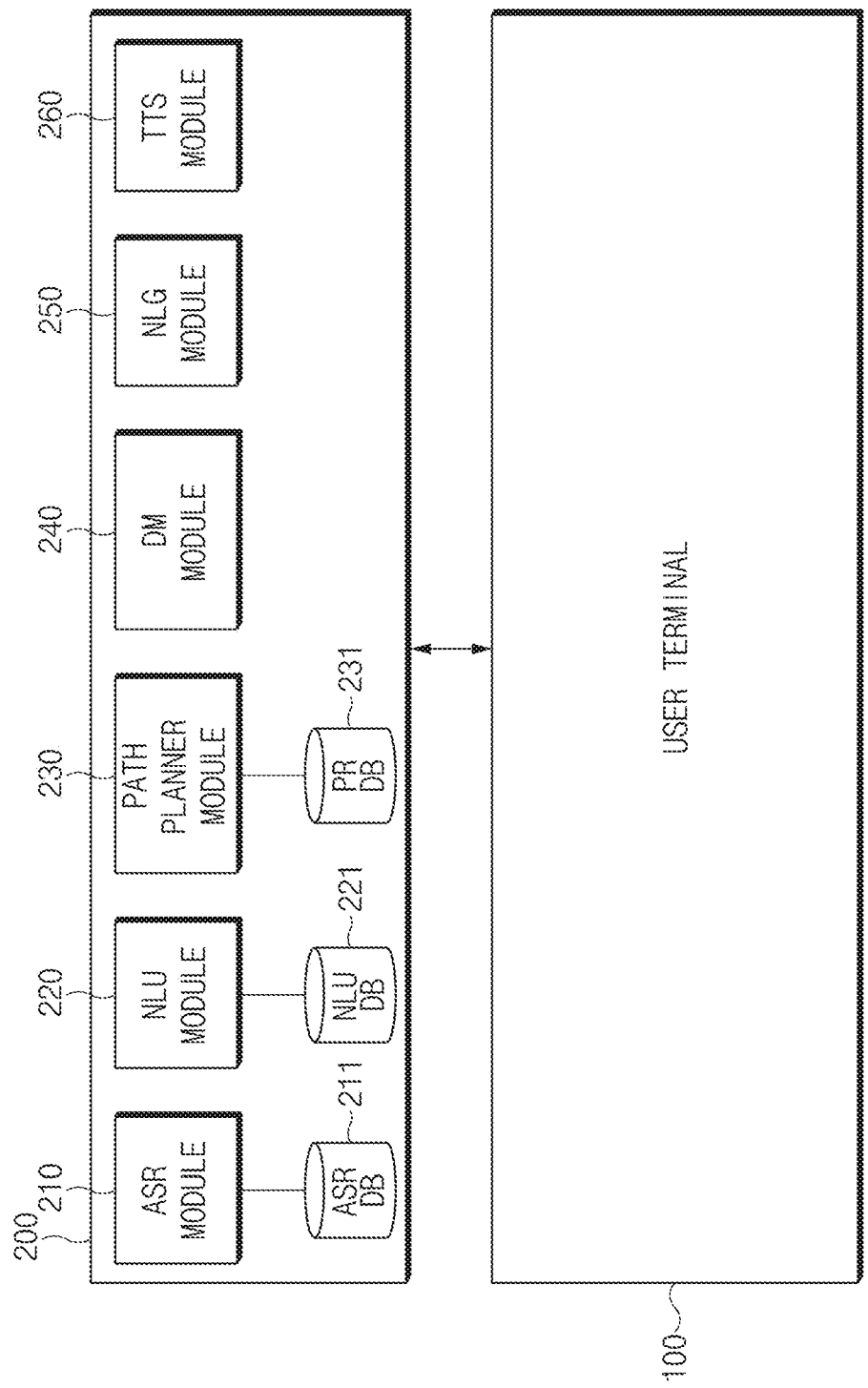
FIG. 5 is a block diagram illustrating an intelligent server of an integrated intelligent system according to an embodiment of the disclosure.

FIG. 5 is a block diagram illustrating an intelligent server of an integrated intelligent system according to an embodiment of the disclosure.

Referring to FIG. 5, the intelligent server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260. According to another embodiment, the intelligent server 200 may include a network interface (e.g., communication circuit), a memory, and a processor, which perform the function of the configuration. When being executed, an instruction stored in the memory may cause the processor to perform an operation to be described below.

The NLU module 220 or the path planner module 230 of the intelligent server 200 may generate a path rule. The path rule may include at least one of the operation of the user terminal 100 and the operation of the external electronic apparatus 400. For example, the path rule may include a sequence of states of each of the user terminal 100 and the external electronic apparatus 400, and the user terminal 100 or the external electronic apparatus 400 that receives the path rule may perform an operation to have the state that the path rule includes.

According to an embodiment, the ASR module 210 may convert the user input received from the user terminal 100 to text data.

According to an embodiment, the ASR module 210 may include a speech recognition module. The speech recognition module may include an acoustic model and a language model. For example, the acoustic model may include information associated with phonation, and the language model may include unit phoneme information and information about a combination of unit phoneme information. The speech recognition module may convert user speech into text data by using the information associated with phonation and unit phoneme information. For example, the information about the acoustic model and the language model may be stored in an ASR database (DB) 211.

According to an embodiment, the NLU module 220 may determine user intent by performing syntactic analysis or semantic analysis. For example, the NLU module 220 may divide the user input into syntactic units (e.g., words, phrases, morphemes, and the like) and may determine the user intent through syntactic analysis for analyzing which syntactic elements the divided units have. Alternatively, the NLU module 220 may determine the user intent through the semantic analysis using semantic matching, rule matching, formula matching, or the like. As such, the NLU module 220 may obtain a domain, intent, or a parameter (or a slot) necessary to express the intent, which corresponds to the user input. In other words, the NLU module 220 may obtain the domain, the intent, or the parameter, which corresponds to a user input, by dividing the user input into a domain classifier, an intent classifier, and slot tagger (or parameter extraction). The domain may be distinct according to the app stored in the user terminal 100 or the external electronic apparatus 400. The intent may be distinct according to the function capable of being executed in the domain. The slot (or parameter) may be a value necessary to perform the function.

According to an embodiment, the NLU module 220 may determine the intent of the user and parameter by using a matching rule that is divided into a domain, intent, and a parameter (or a slot) necessary to determine the intent. For example, one domain according to an app (e.g., an alarm) may include a plurality of intents (e.g., alarm settings, alarm cancellation, and the like), and one intent may include a plurality of parameters (e.g., a time, the number of iterations, an alarm sound, and the like). For another example, one domain according to the external electronic apparatus 400 (e.g., a television (TV)) may include a plurality of intents (e.g., displaying an image in a display, outputting a sound, and the like), and one intent may include a plurality of parameters (e.g., an image, a value of color temperature correction, and the like). The matching rule may be stored in an NLU DB 221.

According to an embodiment, the NLU module 220 may determine the meaning of words extracted from a user input by using linguistic features (e.g., grammatical elements) such as morphemes, phrases, and the like and may determine the user intent by match the meaning of the words to the domain. For example, the NLU module 220 may calculate how many words extracted from the user input is included in each of the domain and the intent, for the purpose of determining the user intent. According to an embodiment, the NLU module 220 may determine a parameter of the user input by using the words, which are based for determining the intent. According to an embodiment, the NLU module 220 may determine the user intent by using the NLU DB 221 storing the linguistic features for determining the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a path rule including the operation of an app of the user terminal 100 based on the intent of the user input and the parameter. The path rule may include the state of an app of the user terminal 100. For example, the NLU module 220 may select an app to be executed, based on the intent of the user input and may determine an operation to be executed, in the selected app. The NLU module 220 may determine information about a parameter necessary to perform the determined operation to generate a path rule including the operation of an app of the user terminal 100.

According to an embodiment, the NLU module 220 may generate the path rule including the operation of an electronic apparatus (e.g., the external electronic apparatus 400) based on the intent and the parameter of the user input. For example, the NLU module 220 may select an electronic apparatus based on the intent of the user input and may determine an operation to be executed by the selected electronic apparatus. The NLU module 220 may determine information (or data) about the parameter necessary to execute the determined operation to generate the path rule including the operation of an electronic apparatus.

According to an embodiment, the NLU module 220 may generate the path rule based on the dependency between operations of a plurality of electronic apparatuses according to the user input. For example, the NLU module 220 may verify an operation, which needs to be performed in advance, from among the operations of a plurality of electronic apparatuses to be included in the path rule and may generate the path rule so as to perform the verified operation of the electronic apparatus in advance.

According to an embodiment, the NLU module 220 may determine the subject controlling the operations of a plurality of electronic apparatuses according to the user input to generate the path rule. For example, the NLU module 220 may determine the subject controlling the operations of a plurality of electronic apparatuses in consideration of the states of the plurality of electronic apparatuses that perform the operation included in the path rule and a network environment in which the plurality of electronic apparatuses are included, and may include the operation of the selected subject (e.g., the user terminal 100 or the IoT cloud 300) in the path rule.

According to an embodiment, the NLU module 220 may determine a method of transmitting data between a plurality of electronic apparatuses and may generate the path rule. For example, the NLU module 220 may determine a method of transmitting and/or receiving data between the plurality of electronic apparatuses in consideration of the states of the plurality of electronic apparatuses and the network environment in which the plurality of electronic apparatuses are included, and may include the operation according to the determined method (e.g., peer-to-peer P2P (or how to transmit directly) or how to transmit through a server) in the path rule.

According to an embodiment, the NLU module 220 may include information (or data) about a parameter necessary to perform the operation of the app to be executed or each of the plurality of electronic apparatuses, in the path rule.

According to an embodiment, the NLU module 220 may generate the path rule of each of a plurality of apps or a plurality of electronic apparatuses, which correspond to the user input, and may generate the path rule corresponding to the user input by using the generated path rule. For example, the NLU module 220 may combine the path rule corresponding to the operation of the first app of the user terminal 100 and a second path rule corresponding to the operation of the second app to generate the path rule corresponding to the user input. For another example, the NLU module 220 may combine a path rule corresponding to the operation of an app of the user terminal 100 and the path rule corresponding to the operation of the external electronic apparatus 400 to generate the path rule corresponding to the user input.

According to an embodiment, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set to determine the path rule.

According to another embodiment, the NLU module 220 may determine the app to be executed, the operation (e.g., at least one or more states) to be executed by the app, and a parameter necessary to execute the operation based on the intent of the user input and the parameter for the purpose of generating one path rule or a plurality of path rules. For example, the NLU module 220 may arrange the app to be executed and the operation to be executed in the app by using information of the user terminal 100 depending on the intent of the user input in the form of ontology or a graph model for the purpose of generating the path rule. For example, the generated path rule may be stored in a path rule (PR) DB 231 through the path planner module 230. The generated path rule may be added to a path rule set of the PR DB 231.

According to an embodiment, the NLU module 220 may select at least one path rule of the generated plurality of path rules. For example, the NLU module 220 may select an optimal path rule of the plurality of path rules. For another example, in the case where only a part of operations is specified based on the user utterance, the NLU module 220 may select a plurality of path rules. The NLU module 220 may determine one path rule of the plurality of path rules depending on an additional input of the user.

According to an embodiment, the path planner module 230 may transmit a path rule corresponding to the operation of an app or an electronic apparatus, to the NLU module 220. For example, a path rule corresponding to the operation of the app or the electronic apparatus may include a normal rule, a caller rule, a callee rule, and a caller/callee rule. The normal rule may be a path rule in which the path rule of another app or an electronic apparatus is not capable of being arranged before and after the normal rule. The caller rule may be a path rule in which the path rule of another app or an electronic apparatus is capable of being arranged after the caller rule. The callee rule may be a path rule in which the path rule of another app or an electronic apparatus is capable of being arranged before the callee rule. The path rule corresponding to the operation of the app or the electronic apparatus may further include a callee/caller rule in which the path rule of another app is capable of being arranged before and after the path rule.

In addition, the path rule may be classified into a static path rule, which is sufficient to perform an operation depending on a path rule combined before and after the path rule, and a dynamic path rule that is not sufficient to perform an operation depending on the path rule. The NLU module 220 may receive a path rule corresponding to the operation of an app or an electronic apparatus from the path planner module 230 to generate a path rule corresponding to the user input. For example, the NLU module 220 may generate the path rule corresponding to the operation of each of a plurality of electronic apparatuses and may generate a path rule corresponding to the user input by using the path rule of each of the plurality of electronic apparatuses. According to an embodiment, the path rule corresponding to the operation of the app or the electronic apparatus may be distinguished and stored in the PR DB 231 for each domain (e.g., an app or an electronic apparatus) depending on the type of a path rule (e.g., caller rule, callee rule, or the like).

According to an embodiment, the path planner module 230 may transmit a path rule set including the plurality of path rules to the NLU module 220. The plurality of path rules of the path rule set may be stored in the PR DB 231 connected to the path planner module 230 as a table. For example, the path planner module 230 may transmit a path rule set corresponding to information (e.g., operating system (OS) information or app information) of the user terminal 100, which is received from the intelligent agent 155, to the NLU module 220. Alternatively, the path planner module 230 may transmit a path rule set corresponding to information (e.g., OS information or app information) of the external electronic apparatus 400 to the NLU module 220 through the IoT cloud 300. For example, a table stored in the PR DB 231 may be stored for each domain or for each version of the domain.

According to an embodiment, the path planner module 230 may select one path rule or the plurality of path rules from the path rule set and transmit the selected one path rule or the selected plurality of path rules to the NLU module 220. For example, the path planner module 230 may match the user intent and the parameter to the path rule set corresponding to the user terminal 100 to select one path rule or a plurality of path rules and may transmit the selected one path rule or the selected plurality of path rules to the NLU module 220.

According to an embodiment, the path planner module 230 may generate the one path rule or the plurality of path rules by using the user intent and the parameter. For example, the path planner module 230 may determine the app to be executed and the operation to be executed in the app based on the user intent and the parameter for the purpose of generating the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, the DM module 240 may determine whether the user intent determined by the NLU module 220 is definite. For example, the DM module 240 may determine whether the user intent is clear, based on whether the information of a parameter is sufficient. The DM module 240 may determine whether the parameter determined by the NLU module 220 is sufficient to perform a task. According to an embodiment, in the case where the user intent is not clear, the DM module 240 may perform a feedback for requesting necessary information from the user. For example, the DM module 240 may perform a feedback for making a request for information about the parameter for determining the user intent.

According to an embodiment, the DM module 240 may include a content provider module. In the case where the content provider module executes an operation based on the intent and the parameter determined by the NLU module 220, the content provider module may generate the result obtained by performing a task corresponding to the user input. According to an embodiment, the DM module 240 may transmit the result generated by the content provider module as the response to the user input to the user terminal 100.

According to an embodiment, the NLG module 250 may change specified information to a text form. Information changed to the text form may be a form of a natural language utterance. For example, the specified information may be information about an additional input, information for guiding the completion of an operation corresponding to the user input, or information for guiding the additional input of the user (e.g., feedback information about the user input). The information changed to the text form may be displayed in the display 130 after being transmitted to the user terminal 100 or may be changed to a voice form after being transmitted to the TTS module 260.

According to an embodiment, the TTS module 260 may change information of the text form to information of a voice form. The TTS module 260 may receive the information of the text form from the NLG module 250, may change the information of the text form to the information of a voice form, and may transmit the information of the voice form to the user terminal 100. The user terminal 100 may output the information of the voice form to the speaker 140.

According to an embodiment, the NLU module 220, the path planner module 230, and the DM module 240 may be implemented as one module. For example, the NLU module 220, the path planner module 230 and the DM module 240 may be implemented with one module, may determine the user intent and the parameter, and may generate a response (e.g., a path rule) corresponding to the determined user intent and parameter. As such, the generated response may be transmitted to the user terminal 100 or the IoT cloud 300.

Figure 6:
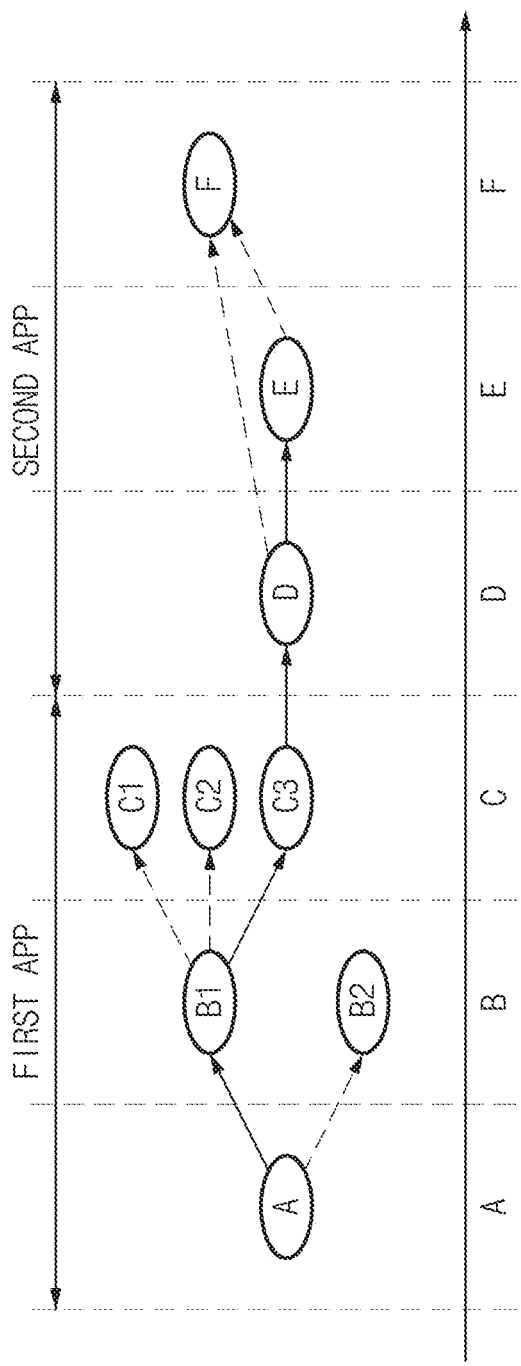
FIG. 6 is a view illustrating a path rule generating method of a natural language understanding (NLU) module according to an embodiment of the disclosure.

FIG. 6 is a view illustrating a path rule generating method of a NLU module according to an embodiment of the disclosure.

Referring to FIG. 6, according to an embodiment, the NLU module 220 may divide the function of an app or an electronic apparatus into unit actions (e.g., A to F) and may store the divided unit actions in the PR DB 231. For example, the NLU module 220 may store a path rule set including a plurality of path rules A-B1-C1, A-B1-C2, A-B1-C3-D-F, and A-B1-C3-D-E-F, each of which is divided into unit actions, in the PR DB 231.

According to an embodiment, the PR DB 231 of the path planner module 230 may store the path rule set for performing the function of an app. The path rule set may include a plurality of path rules each of which includes a plurality of actions. An action executed depending on a parameter input to each of the plurality of actions included in each of the plurality of path rules may be sequentially arranged. According to an embodiment, the plurality of path rules implemented in a form of ontology or a graph model may be stored in the PR DB 231.

According to an embodiment, the NLU module 220 may select an optimal path rule A-B1-C3-D-F of the plurality of path rules A-B1-C1, A-B1-C2, A-B1-C3-D-F, and A-B1-C3-D-E-F corresponding to the intent of a user input and the parameter.

According to an embodiment, the NLU module 220 may select one of a plurality of path rules based on an input added by the user terminal 100 and may transmit the selected one path rule to the user terminal 100. For example, the NLU module 220 may select one path rule (e.g., A-B1-C3-D-F) of the plurality of path rules (e.g., A-B1-C1, A-B1-C2, A-B1-C3-D-F, and A-B1-C3-D-E-F) depending on the user input (e.g., an input for selecting C3) additionally entered by the user terminal 100 for the purpose of transmitting the selected one path rule to the user terminal 100.

According to another embodiment, the NLU module 220 may determine the intent of a user and the parameter corresponding to the user input (e.g., an input for selecting C3) additionally entered by the user terminal 100 for the purpose of transmitting the user intent or the parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

As such, the user terminal 100 may complete the operation of the app 151 or 153 or the electronic apparatus (e.g., the user terminal 100 or the external electronic apparatus 400) depending on the selected one path rule.

According to an embodiment, in the case where a user input in which information is insufficient is received by the intelligent server 200, the NLU module 220 may generate a path rule partly corresponding to the received user input. For example, the NLU module 220 may transmit the partly corresponding path rule to the intelligent agent 155. The intelligent agent 155 may transmit the partially corresponding path rule to the execution manager module 157, and the execution manager module 157 may execute the operation of an app or an electronic apparatus depending on the path rule. The execution manager module 157 may transmit information about an insufficient parameter to the intelligent agent 155 while executing the operation of the app or the electronic apparatus. The intelligent agent 155 may request an additional input from a user by using the information about the insufficient parameter. If the additional input is received by the user, the intelligent agent 155 may transmit and process the additional input to the intelligent server 200. The NLU module 220 may transmit the additionally generated path rule to the intelligent agent 155 based on the intent of the additionally entered user input and parameter information. The intelligent agent 155 may transmit the path rule to the execution manager module 157 to execute the remaining apps or the electronic apparatus.

According to an embodiment, Table 1 attached below may indicate an example path rule associated with a task that a user requests.

TABLE 1

| Path rule ID | State | parameter |
|---|---|---|
| Gallery_101 | pictureView(25) | NULL |
| | searchView(26) | NULL |
| | searchViewResult(27) | Location, time |
| | SearchEmptySelectedView(28) | NULL |
| | SearchSelectedView(29) | ContentType, selectall |
| | CrossShare(30) | anaphora |

Referring to Table 1, a path rule that is generated or selected by an intelligent server 200 depending on user speech (e.g., "please share a picture") may include at least one state 25, 26, 27, 28, 29 or 30. For example, the at least one state (e.g., one operating state of a terminal) may correspond to at least one of the picture application execution PicturesView 25, the picture search function execution SearchView 26, the search result display screen output SearchViewResult 27, the search result display screen output, in which a picture is non-selected, SearchEmptySelectedView 28, the search result display screen output, in which at least one picture is selected, SearchSelectedView 29, or the share application selection screen output CrossShare 30.

In an embodiment, parameter information of the path rule may correspond to at least one state. For example, the parameter information of the path rule may be included in the search result display screen output, in which at least one picture is selected, SearchSelectedView 29.

The task (e.g., "please share a picture!") that the user requests may be performed depending on the execution result of the path rule including the sequence of the states 25, 26, 27, 28, and 29.

Table 2 attached below shows information transmitted from the intelligent server 200 to the IoT cloud 300, according to an embodiment.

TABLE 2

| field 1 | field 2 | filed 3 | field 4 |
|---|---|---|---|
| TCP/IP header | The number of commands | command 1 | command 2 |

Referring to Table 2, the information transmitted from the intelligent server 200 to the IoT cloud 300 may include a transmission control protocol (TCP)/Internet Protocol (IP) header, the number of commands, a first command (command 1), and a second command (command 2). According to an embodiment, since the communication (or communication between servers) between the intelligent server 200 and the IoT cloud 300 is capable of using a TCP/IP communication scheme, the information transmitted to the IoT cloud 300 may include the TCP/IP header as a first field value (field 1). According to an embodiment, the information transmitted from the intelligent server 200 to the IoT cloud 300 may include information for controlling the plurality of external electronic apparatuses 400. The information transmitted to the IoT cloud 300 may include the number of commands included in the information transmitted to the IoT cloud 300, as a second field value (field 2). The information transmitted to the IoT cloud 300 may include at least one command corresponding to the number of commands after a third field (field 3). For example, the information transmitted to the IoT cloud 300 may include the first command (command 1) and the second command (command 2), as the third field value (field 3) and a fourth field value (field 4). For example, the at least one command may include information about the path rule. In addition, the at least one command may include the type of a device to which the command is transmitted and dependency information about another command. The at least one command may be provided in a JavaScript object notation (JSON) format in which the attribute of information necessary for an IoT device (or the external electronic apparatus 400) to operate corresponds to the value of the information.

Table 3 below is an exemplification in which the first command (command 1) and the second command (command 2) associated with the user input (e.g., "show me the picture stored in the refrigerator on the TV!") are described in the JSON format.

TABLE 3

```
{
    "score": 0,
    "pathRuleId": "Refrigerator_558",
    "apps":
    [
        {
            "appName": "refmanager",
            "appName": "gallery"
        }
    ],
    "seqNums": 7,
    "DeviceNums": "2",
    "Dependency": true,
    intent": "Refrigerator_558",
    "states":
    [
        {
            "seqNum": 1,
            "devicetype": "refrigerator",
            "appName": "refmanager",
            "stateId": "MainScreen",
            "isLandingState": false,
            "isExecuted": false,
            "subIntent": "MainScreen"
        },
        {
            "seqNum": 2,
            "devicetype": "refrigerator",
            "appName": "refmanager",
            "stateId": "AllDevices",
            "isLandingState": true,
            "isExecuted": false,
            "subIntent": "AllDevices"
        },
        {
            "seqNum": 3,
            "devicetype": "refrigerator",
            "appName": "refmanager",
            "stateId": "RefMainScreen",
            "isLandingState": false,
            "isExecuted": false,
            "subIntent": "RefMainScreen"
        },
        {
            "seqNum": 4,
            "devicetype": "refrigerator",
            "appName": "refmanager",
            "stateId": "RefInsideImage",
            "isLandingState": true,
            "isExecuted": false,
            "subIntent": "RefInsideImage",
        },
        {
            "seqNum": 5,
            "devicetype": "refrigerator",
            "appName": "refmanager",
            "stateId": "CrossShare",
            "isLandingState": true,
            "isExecuted": false,
            "isDependencyDevice": true,
            "subIntent": "CrossShare",
            "parameters":
```

TABLE 3-continued

```
[
    {
            "parameterName": "targetDevice",
            "parameterType": "String",
            "isMandatory": true,
            "slotType": "targetDevice",
            "slotName": "targetDevice",
            "slotValue": "TV",
            "slotValueType": "String"
        },
    ]
},
{
    "seqNum": 6,
    "devicetype": "TV",
    "appName": "gallery",
    "stateId": "CrossShare",
    "isLandingState": true,
    "isExecuted": false,
    "isDependencyDevice": true,
    "subIntent": "showImage",
    "parameters":
    [
        {
            "parameterName": "sentDevice",
            "parameterType": "String",
            "isMandatory":true,
            "slotType": "sentDevice",
            "slotName": "sentDevice",
            "slotValue": "refrigerator",
            "slotValueType": "String"
        },
    ]
},
{
    "seqNum": 7,
    "devicetype": "TV", //a device performing a rule
    "appName": "gallery",
    "stateId": "showImage",
    "isLandingState": true,
    "isExecuted": false,
    "subIntent": "showImage",
},
]
"isConditional": false,
"sampleUtterance": "show me a picture stored in a refrigerator on a TV",
"isRoot": false,
"utterance": "show me a picture stored in a refrigerator on a TV"
}
```

Figure 7:
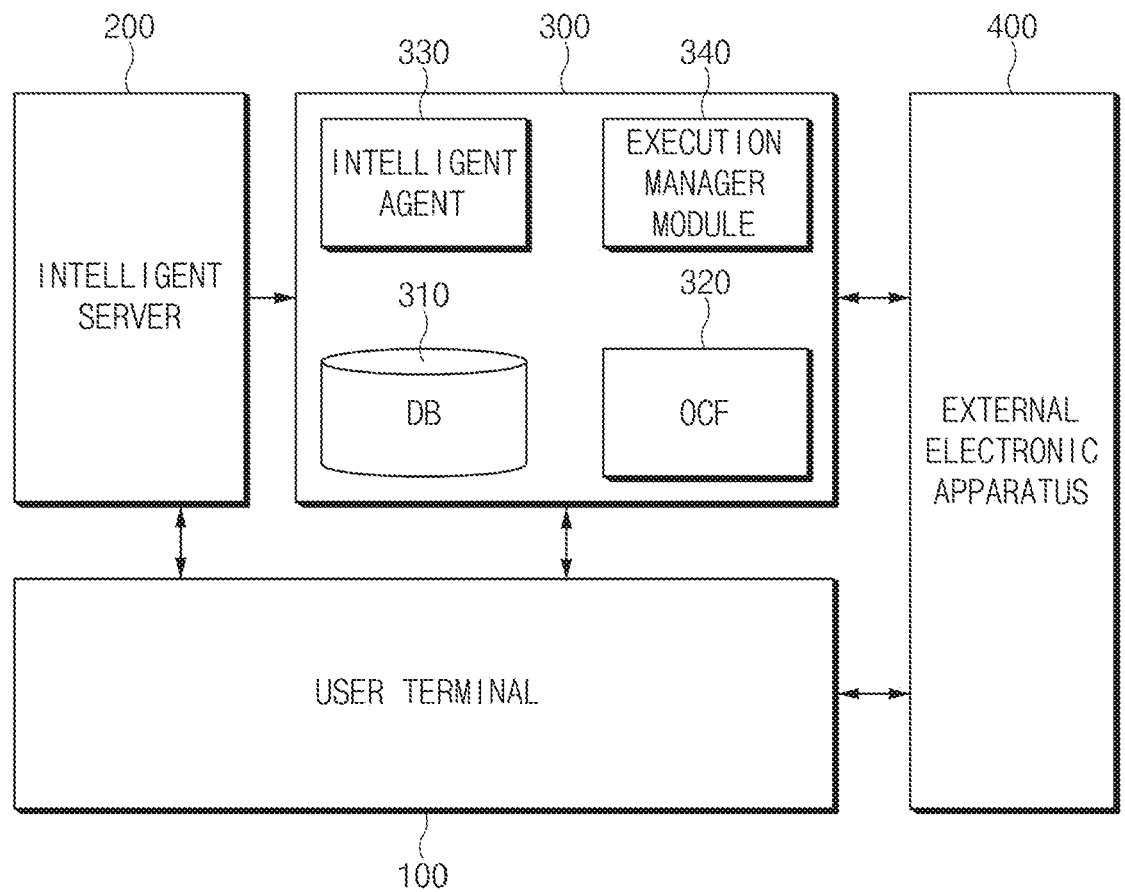
FIG. 7 is a block diagram illustrating an Internet of things (IoT) cloud of an integrated intelligent system according to an embodiment of the disclosure.

FIG. 7 is a block diagram illustrating an IoT cloud of an integrated intelligent system according to an embodiment of the disclosure.

Referring to FIG. 7, the IoT cloud 300 may include a DB (or memory) 310, an OCF module 320, an intelligent agent 330, or an execution manager module 340. The IoT cloud 300 may further include a communication circuit (not illustrated). The IoT cloud 300 may relay the transmission of the command and data between the user terminal 100 and the external electronic apparatus 400. According to an embodiment, the IoT cloud 300 may include a network interface (e.g., communication circuit), a memory, and a processor. When an instruction stored in the memory is executed, the processor may perform an operation to be described below.

The DB 310 may store data received from the user terminal 100 or the external electronic apparatus 400. The DB 310 may receive and store data generated by the operation of the user terminal 100 or the external electronic apparatus 400. According to an embodiment, the DB 310 may be implemented in a memory. The data received from the user terminal 100 or the external electronic apparatus 400 may be stored in the memory.

The OCF module 320 may include a function for controlling the external electronic apparatus 400 through a communication network. The OCF module 320 may include an OCF library for controlling the external electronic apparatus 400 through the communication network. The OCF library may include an app and data management function, a routing function, and an event handler function that controls the external electronic apparatus 400. In other words, the plurality of functions may be implemented in the OCF library. According to an embodiment, the OCF library may be stored in a memory. The OCF library stored in the memory may be executed and may implement the plurality of functions.

The intelligent agent 330 may receive a path rule for operating the external electronic apparatus 400 from the intelligent server 200. According to an embodiment, the intelligent agent 330 may generate a command for operating the external electronic apparatus 400 depending on the received path rule. For example, in the case where the received path rule operates a plurality of external electronic apparatuses, the intelligent agent 330 may determine the dependency of the operations of the plurality of external electronic apparatuses and may sequentially transmit the sequence of states of a plurality of external electronic apparatuses included in the received path rule, to a plurality of external electronic apparatuses depending on the dependency. For example, the received path rule may include the path rule of each of a plurality of electronic apparatuses.

The execution manager module 340 may receive the generated command from the intelligent agent 330 to transmit the received command to the external electronic apparatus 400. For example, the command may include a path rule in which the operations of the external electronic apparatus 400 are sequentially arranged and data necessary to perform an operation included in the path rule.

According to an embodiment, the intelligent agent 330 receives data from the user terminal 100 or the external electronic apparatus 400 to store the data in an address (e.g., a universal resource locator (URL)) of the DB 310. For example, the intelligent agent 330 may transmit information about an address at which the data is stored, to the user terminal 100 or the external electronic apparatus 400 transmitting the data.

The execution manager module 340 may receive the generated command from the intelligent agent 330 and may transmit the command to the external electronic apparatus 400. According to an embodiment, the execution manager module 340 may control the operation of the external electronic apparatus 400 by using the OCF module 320. For example, the execution manager module 340 may control the operation of the external electronic apparatus 400 by using the function of the OCF library.

According to an embodiment, the intelligent agent 330 and the execution manager module 340 may be implemented by a processor. In other words, the IoT cloud 300 may include a processor, and the processor may include the intelligent agent 330 and the execution manager module 340.

According to an embodiment, the IoT cloud 300 may be connected to the external electronic apparatus 400 through a router. The router may connect between the IoT cloud 300 and the external electronic apparatus 400. For example, the router may include a communication module for connecting between the IoT cloud 300 and the external electronic apparatus 400. In addition, similarly to the IoT cloud 300, the router may further include an intelligent agent and an execution manager module that receive a path rule to control the external electronic apparatus 400. According to an embodiment, the router may transmit the data generated depending on the operation of the external electronic apparatus 400, to the IoT cloud 300, and may receive information about an address, at which the data is stored, from the IoT cloud 300 to transmit information about the address to another electronic apparatus requiring data.

Figure 8:
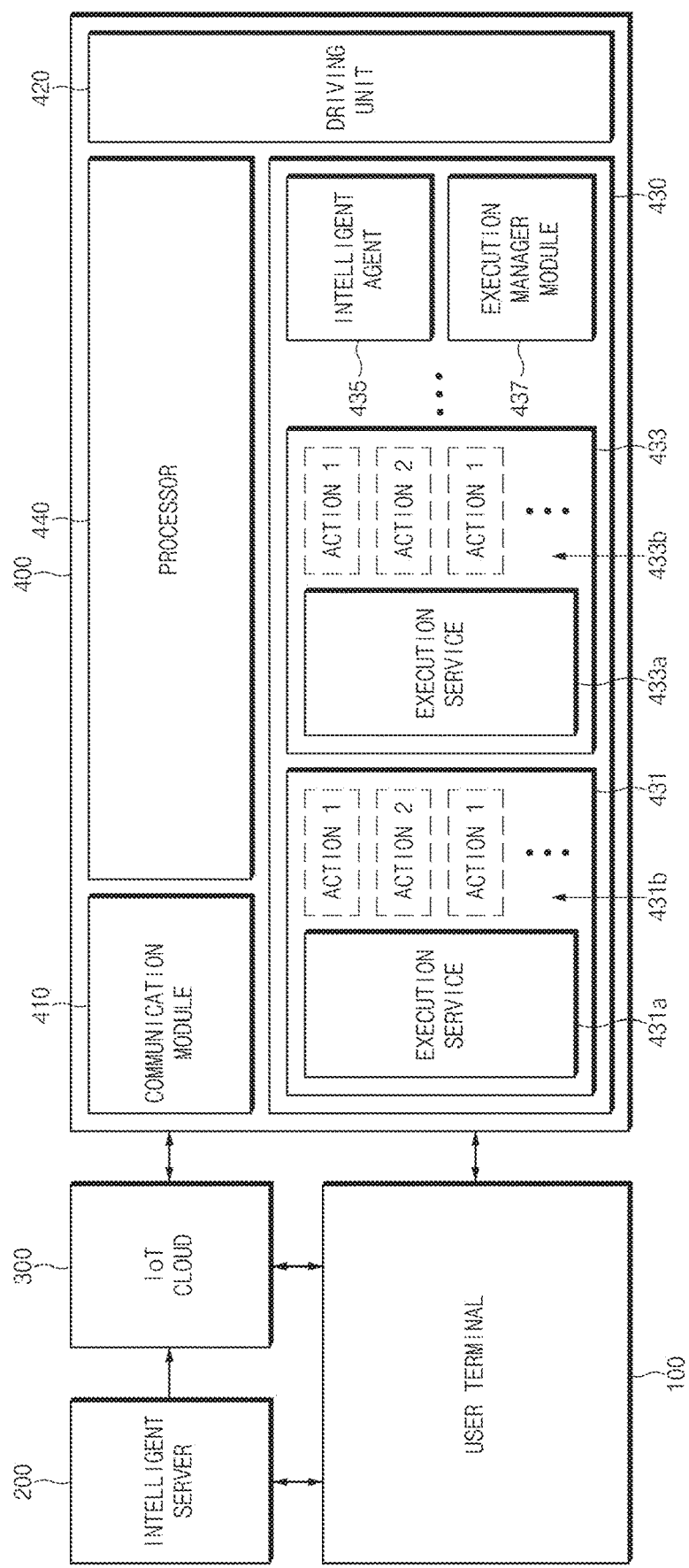
FIG. 8 is a block diagram illustrating an electronic apparatus of an integrated intelligent system, according to an embodiment of the disclosure.

FIG. 8 is a block diagram illustrating an electronic apparatus of an integrated intelligent system according to an embodiment of the disclosure.

Referring to FIG. 8, the external electronic apparatus 400 may include a communication module 410, a driving unit 420, a memory 430, and a processor 440.

The communication module (or communication circuit) 410 may be connected to an external apparatus so as to transmit and/or receive a signal. For example, the communication module 410 may be connected to the user terminal 100 or the IoT cloud 300 through a wireless communication module (e.g., Bluetooth, Wi-Fi, or the like).

The driving unit 420 may output the result according to the execution of the operation of the external electronic apparatus 400. For example, the driving unit 420 may include a display. The driving unit 420 may display an image, a video, and/or the execution screen of an app generated depending on the operation of the external electronic apparatus 400, through the display. Furthermore, the driving unit 420 may include a speaker. The driving unit 420 may output a voice signal generated inside the external electronic apparatus 400, to the outside through the speaker.

The memory 430 may store a plurality of apps 431 and 433. For example, the plurality of apps 431 and 433 stored in the memory 430 may include execution services 431a and 433a or a plurality of actions 431b and 433b. The plurality of apps 431 and 433 may be loaded by the processor 440 to generate the execution services 431a and 433a, and then may execute the plurality of actions 431b and 433b by the execution services 431a and 433a.

According to an embodiment, the memory 430 may store an intelligent agent 435 or an execution manager module 437. The intelligent agent 435 and the execution manager module 437 may be similar to the intelligent agent 155 and the execution manager module 157 of FIG. 2. In other words, the intelligent agent 435 and the execution manager module 437 may be a framework (or application framework). In another example, the intelligent agent 435 or the execution manager module 437 may be implemented by the processor 440.

The processor 440 may control an overall operation of the external electronic apparatus 400. For example, the processor 440 may control the communication module 120 to access an external electronic apparatus and may transmit and/or receive data to and/or from the external electronic apparatus. The processor 440 may control the driving unit 420 to output the result of the operation. The processor 440 may control the memory 430 to execute a program and may read or store necessary information.

According to an embodiment, the processor 440 may execute the intelligent agent 435 to receive a command for operating the external electronic apparatus 400, which is received through the communication module 410, from the user terminal 100 or the IoT cloud 300. For example, the received command may include a path rule in which the operations of the external electronic apparatus 400 are sequentially arranged. Moreover, the received command may include data necessary to perform operations included in the path rule or information about an address (e.g., a URL), at which the data is stored in the IoT cloud 300. According to an embodiment, in the case where the processor 440 executes the intelligent agent 435 to include information about an address at which the data is stored in the command, the processor 440 may transmit a request including information about the address to the IoT cloud 300 to obtain the data.

According to an embodiment, the processor 440 may execute the intelligent agent 435 to select the apps 431 and 433 stored in the memory 430, depending on the received path rule and may generate a command for executing the actions 431b and 433b included in the selected app. The processor 440 may execute the execution manager module 437 to execute and bind the selected apps 431 and 433 and may receive the generated command from the intelligent agent 435 to execute the operations of the selected apps 431 and 433. The processor 440 may execute the execution manager module 437 to sequentially transmit the actions 431b and 433b included in the path rule, to the apps 431 and 433, and thus the apps 431 and 433 may execute the actions 431b and 433b.

According to an embodiment, the processor 440 may execute the intelligent agent 435 to receive information about the execution state of the operation of the app 431 or 433. For example, the processor 440 may execute the intelligent agent 435 to receive the information about execution states of the operations of the apps 431 and 433, through the execution manager module 437. For example, the information about execution states of the operations of the app 431 or 433 may be information of a state in which the execution of the operation of the app 431 or 433 or the external electronic apparatus 400 is completed. For example, the information about the execution state of the operation of the app 431 or 433 may be information of a state in which the execution of the operation of the app 431 or 433 is interrupted. The processor 440 may execute the intelligent agent 435 to transmit the execution state of the operation of the app 431 or 433 to the user terminal 100. The user terminal 100 may make a request for an additional input of necessary information to a user, by using the execution state.

Figure 9:
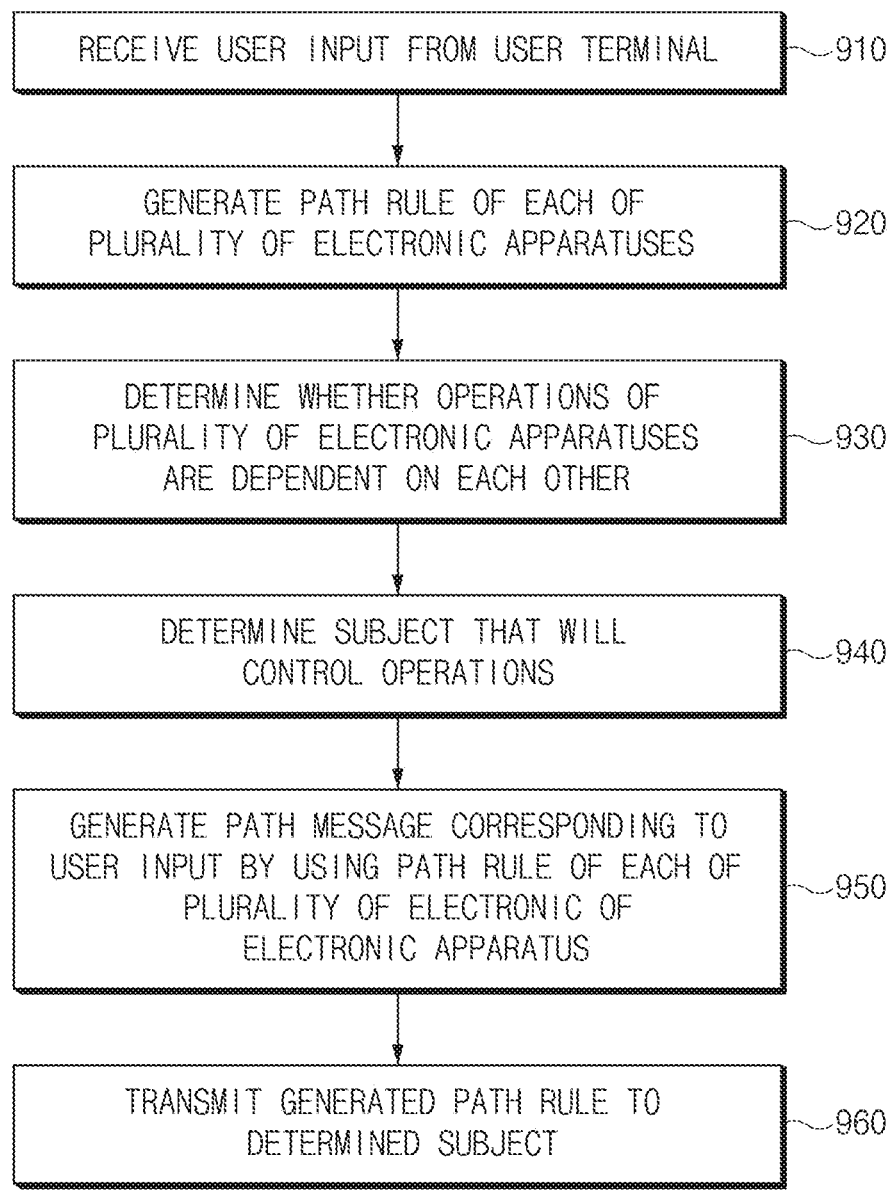
FIG. 9 is a flowchart illustrating a method in which an intelligent server generates a path rule and transmits the generated path rule according to an embodiment.

FIG. 9 is a flowchart illustrating a method in which an intelligent server generates a path rule and transmits the generated path rule according to an embodiment of the disclosure.

Referring to FIG. 9, the intelligent server 200 may generate a path rule corresponding to a user input, may determine a subject that will control the operations of a plurality of electronic apparatuses included in the generated path rule, and may transmit the path rule to the determined subject.

According to an embodiment, in operation 910, the intelligent server 200 may receive a user input (e.g., user voice signal) from the user terminal 100. For example, the user input may be an input for executing the operations of a plurality of electronic apparatuses (e.g., the user terminal 100 and the external electronic apparatus 400).

According to an embodiment, in operation 920, the intelligent server 200 (e.g., the NLU module 220) may generate a path rule of each of a plurality of electronic apparatuses performing a task corresponding to a user input. For example, the intelligent server 200 may generate the path rule such that the user terminal 100 controls the operations of a plurality of electronic apparatuses. For another example, the intelligent server 200 may be configured such that the IoT cloud 300 controls a plurality of electronic apparatuses.

According to an embodiment, in operation 930, the intelligent server 200 may determine whether the operations of the plurality of electronic apparatuses are dependent on each other. For example, the intelligent server 200 may determine whether data generated by the execution of an operation corresponding to the state of a path rule of one electronic apparatus is data (or parameter) necessary for an operation corresponding to the state of a path rule of another electronic apparatus, to determine whether the operations of the plurality of electronic apparatuses are dependent on each other. For another example, the intelligent server 200 may determine whether the operations of the plurality of electronic apparatuses are dependent on each other, depending on the characteristic (or type) of the generated path rule of each of the plurality of electronic apparatuses. For example, in the case where the generated path rule of each of the plurality of electronic apparatuses is a caller rule or a callee rule, the operations of the plurality of electronic apparatuses may be dependent on each other.

According to an embodiment, in operation 940, the intelligent server 200 may determine the subject that will control the operations of a plurality of electronic apparatuses. For example, the intelligent server 200 may determine a device that will control the operations of a plurality of electronic apparatuses according to a path rule, depending on a specified priority. The intelligent server 200 may determine a device that will control the operations of the plurality of electronic apparatuses according to the path rule, depending on the path rule generated in operation 920 is the device. In addition, the intelligent server 200 may determine a subject, which will control the operations of a plurality of electronic apparatuses according to a path rule, based on at least one of the state of a device, which will control the operations of a plurality of electronic apparatuses, and a network environment in which the plurality of electronic apparatuses are included. For example, the intelligent server 200 may determine that one of the user terminal 100 and the IoT cloud 300 is the subject that will control the operations of the plurality of electronic apparatuses.

According to an embodiment, in operation 950, the intelligent server 200 may generate a message (or a response) corresponding to the user input by using a path rule of each of the plurality of electronic apparatuses. For example, the intelligent server 200 may generate a path rule corresponding to the user input based on whether the operations of the plurality of electronic apparatuses are dependent on each other and the subject that will control the operations of the plurality of electronic apparatuses.

For example, the message may include one path rule including a state in which the execution of the operations of a plurality of electronic apparatuses are completed, as well as a state included in a path rule of each of the plurality of electronic apparatuses. In the case where the operations of the plurality of electronic apparatuses are dependent on each other, the message may include the state in which the execution is completed. Furthermore, in the case where it is determined that the user terminal 100 is the subject that will control the operations of a plurality of electronic apparatuses, the message may further include a state corresponding to the operation of the dedicated app 151' of the user terminal 100.

For another example, the message may be a data packet including a field indicating a value (e.g., 0 or 1) indicating whether the plurality of electronic apparatuses are dependent on each other, as well as a field indicating a path rule of each of a plurality of electronic apparatuses. The IoT cloud 300 may verify the field indicating whether the plurality of electronic apparatuses are dependent on each other, to transmit the path rule of each of the plurality of electronic apparatuses sequentially or in parallel.

According to an embodiment, in operation 960, the intelligent server 200 may transmit the generated path rule to the determined subject. The determined subject may receive the path rule and may control the operations of the plurality of electronic apparatuses included in the received path rule.

Figure 10:
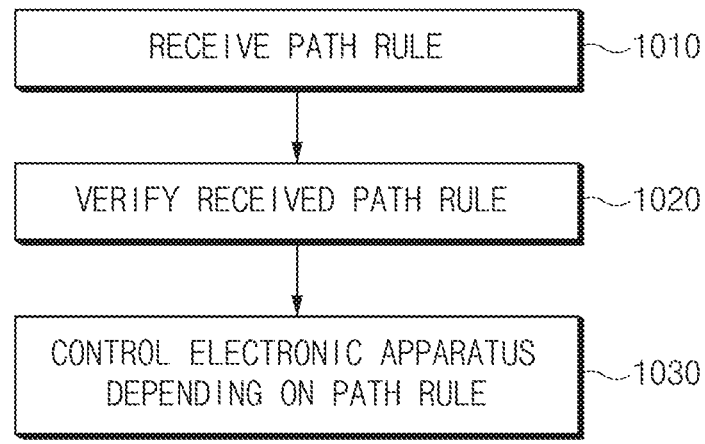
FIG. 10 is a flowchart illustrating a method in which a user terminal or an IoT cloud controls operations of a plurality of electronic apparatuses depending on a received path rule according to an embodiment of the disclosure.

FIG. 10 is a flowchart illustrating a method in which a user terminal or an IoT cloud controls operations of a plurality of electronic apparatuses depending on a received path rule according to an embodiment of the disclosure.

Referring to FIG. 10, the user terminal 100 or the IoT cloud 300 may receive a path rule corresponding to a user input and may control the operations of a plurality of electronic apparatuses included in the path rule.

According to an embodiment, in operation 1010, the user terminal 100 or the IoT cloud 300 may receive the path rule corresponding to the user input from the intelligent server 200. For example, the path rule may include the operations of the plurality of electronic apparatuses including the user terminal 100 and the external electronic apparatus 400.

According to an embodiment, in operation 1020, the user terminal 100 (e.g., the intelligent agent 155) or the IoT cloud 300 (e.g., the intelligent agent 330) may verify the received path rule. For example, the user terminal 100 or the IoT cloud 300 may determine whether the operations of the plurality of electronic apparatuses included in the path rule are dependent on each other.

According to an embodiment, in operation 1030, the user terminal 100 or the IoT cloud 300 may control the plurality of electronic apparatuses for the purpose of executing the operation included in the path rule. For example, the user terminal 100 may execute a part of operations included in the path rule and may control the external electronic apparatus 400 for the purpose of executing the remaining operations other than the executed operations. For another example, the IoT cloud 300 may control the plurality of external electronic apparatuses for the purpose of executing the operation included in the path rule.

Figure 11:
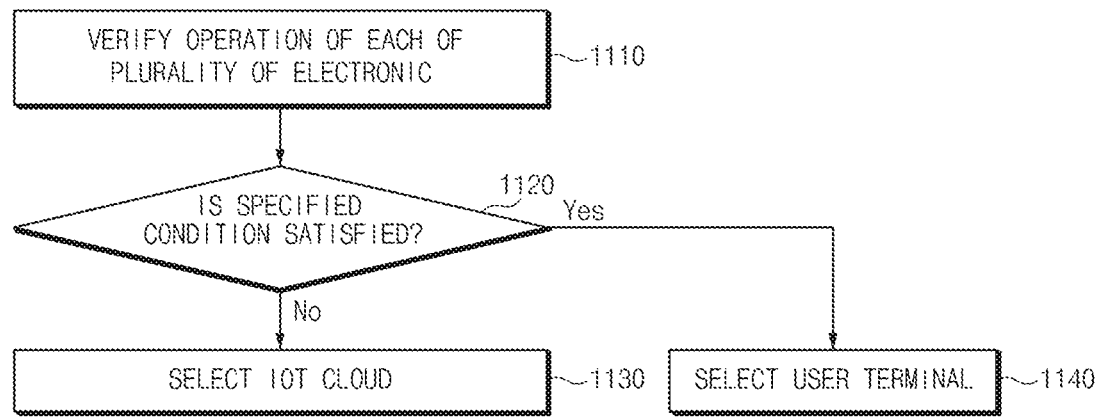
FIG. 11 is a flowchart illustrating a method in which an intelligent server determines a subject, which will control operations of a plurality of electronic apparatuses included in a path rule, according to an embodiment of the disclosure.

FIG. 11 is a flowchart illustrating a method in which an intelligent server determines a subject, which will control operations of a plurality of electronic apparatuses included in a path rule, according to an embodiment of the disclosure.

Referring to FIG. 11, the intelligent server 200 (e.g., the NLU module 220) may determine a subject controlling the operations of a plurality of electronic apparatuses based on the states of a plurality of electronic apparatuses performing a task corresponding to a user input and a network environment including the plurality of electronic apparatuses. For example, in the case where the specified condition is satisfied, the intelligent server 200 may determine that the user terminal 100 is the subject controlling the operations of a plurality of electronic apparatuses included in the path rule.

According to an embodiment, in operation 1110, the intelligent server 200 may verify the operation of each of a plurality of electronic apparatuses for performing a task corresponding to a user input. For example, the intelligent server 200 may verify the path rule of each of the plurality of electronic apparatuses for performing the task.

According to an embodiment, in operation 1120, the intelligent server 200 may determine whether the user terminal 100 or the external electronic apparatus 400 satisfies the specified condition. For example, the intelligent server 200 may determine whether the user terminal 100 receives the user input. In the case where the user terminal 100 receives a user input (Yes), in operation 1140, the intelligent server 200 (e.g., the NLU module 220) may determine that the user terminal 100 is the subject controlling the operations of the plurality of electronic apparatuses.

For another example, the intelligent server 200 may determine whether the operation of the user terminal 100 for performing a task corresponding to the user input is needed.

In the case where the operation of the user terminal 100 for performing the task is needed (Yes), in operation 1140, the intelligent server 200 may determine that the user terminal 100 is the subject controlling the plurality of electronic apparatuses. For example, the operation of the user terminal 100 may include an operation of transmitting data to the external electronic apparatus 400. For another example, the operation of the user terminal 100 may include an operation (e.g., sharing operation) through a local network.

For another example, the intelligent server 200 may determine whether the user terminal 100 and the external electronic apparatus 400 are connected to the same local network. In the case where the user terminal 100 and the external electronic apparatus 400 are present in the same local network (Yes), in operation 1140, the intelligent server 200 may determine that the user terminal 100 is the subject controlling the plurality of electronic apparatuses.

According to an embodiment, in the case where the intelligent server 200 does not satisfy the specific condition (No), in operation 1130, the intelligent server 200 may determine that the IoT cloud 300 is the subject controlling the plurality of electronic apparatuses.

Figure 12:
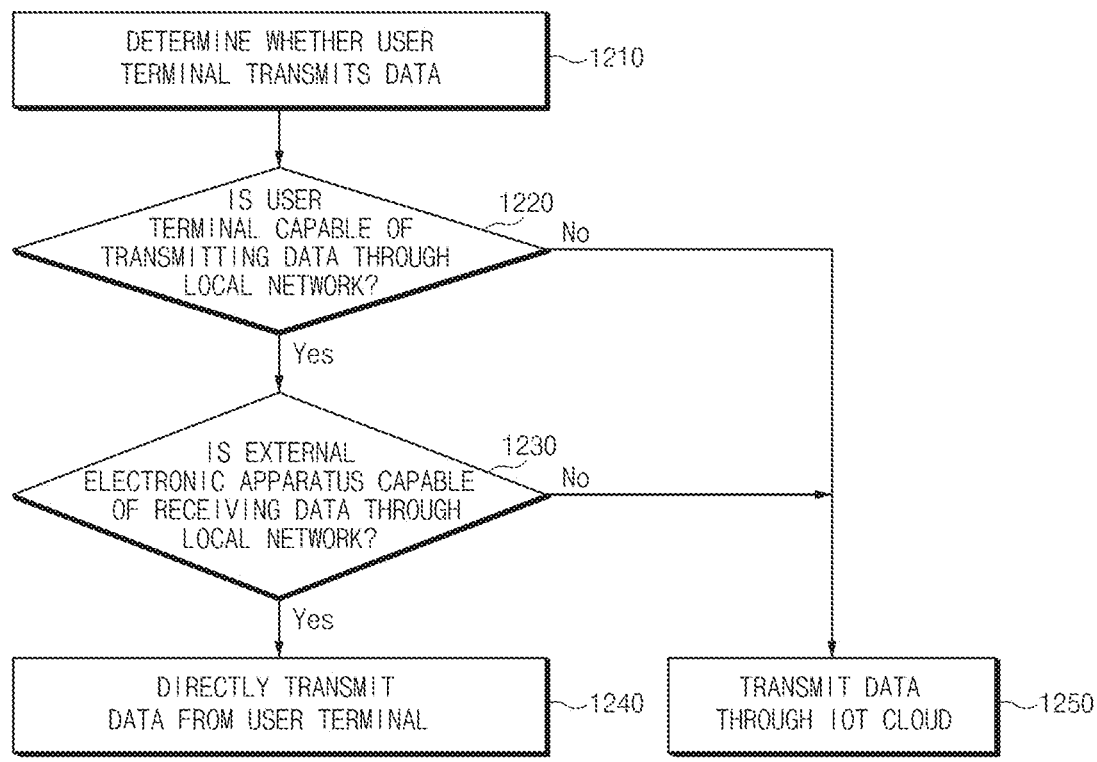
FIG. 12 is a flowchart illustrating a method of determining a method in which a user terminal transmits data to an external electronic apparatus according to an embodiment of the disclosure.

FIG. 12 is a flowchart illustrating a method of determining a method in which a user terminal transmits data to an external electronic apparatus according to an embodiment of the disclosure.

Referring to FIG. 12, the intelligent server 200 (e.g., the NLU module 220) may determine a method of transmitting data generated by one electronic apparatus to another electronic apparatus, in consideration of the states of a plurality of electronic apparatuses and a network environment. For example, in the case where data transmission is needed when an operation is performed in the user terminal 100 depending on a path rule, the intelligent server 200 may determine a method of transmitting the generated data to the external electronic apparatus 400.

According to an embodiment, in operation 1210, the intelligent server 200 may determine whether the user terminal 100 transmits data.

According to an embodiment, in operation 1220, the intelligent server 200 may determine whether the user terminal 100 is capable of directly transmitting data to the external electronic apparatus 400 through a local network. In the case where the user terminal 100 is not capable of directly transmitting data to the external electronic apparatus 400 through the local network (No), in operation 1250, the intelligent server 200 may determine that the user terminal 100 transmits data to the external electronic apparatus 400 through the IoT cloud 300.

According to an embodiment, in operation 1230, in the case where the user terminal 100 is capable of directly transmitting data to the external electronic apparatus 400 through the local network (Yes), the intelligent server 200 may determine whether the external electronic apparatus 400 is capable of receiving data through the local network. In the case where the external electronic apparatus 400 does not receive data through the local network (No), in operation 1250, the intelligent server 200 may determine that the user terminal 100 transmits data to the external electronic apparatus 400 through the IoT cloud 300.

According to an embodiment, in operation 1240, in the case where the external electronic apparatus 400 is capable of receiving data through the local network (Yes), the intelligent server 200 may determine that the user terminal 100 directly transmits data to the external electronic apparatus 400.

Figure 13:
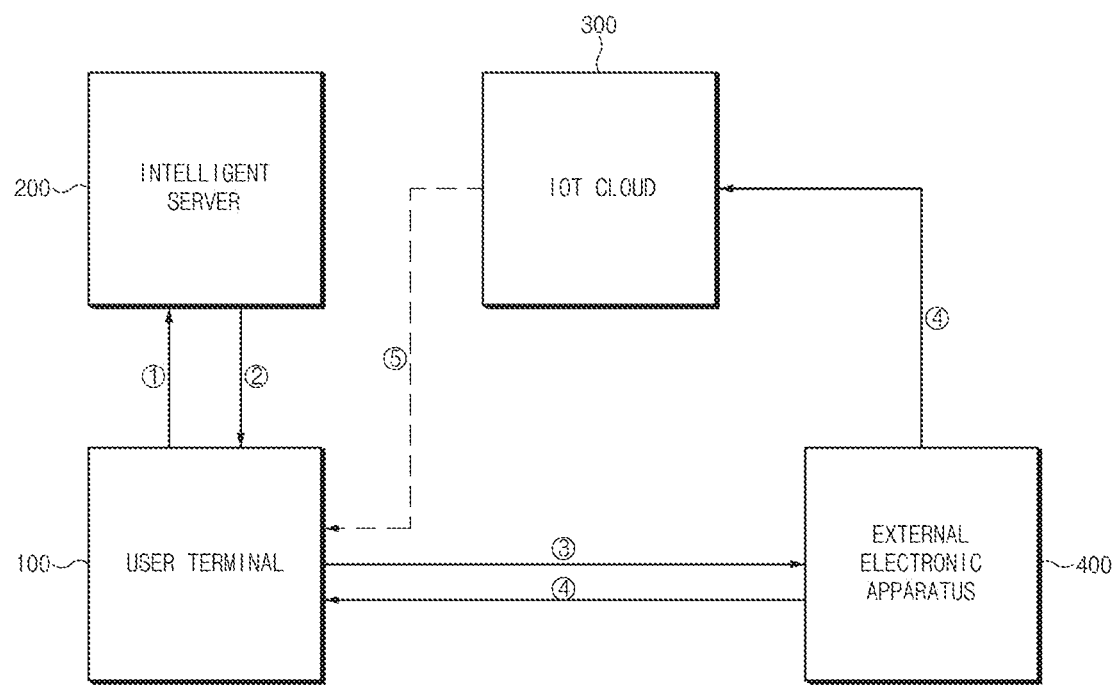
FIG. 13 is a diagram illustrating a method in which a user terminal directly transmits data to an external electronic apparatus according to an embodiment of the disclosure.

FIG. 13 is a diagram illustrating a method in which a user terminal directly transmits data to an external electronic apparatus according to an embodiment.

Referring to FIG. 13, the user terminal 100 may receive a path rule from the intelligent server 200 and may control a plurality of electronic apparatuses depending on the received path rule. The user terminal 100 may transmit the generated data depending on the received path rule, to the external electronic apparatus 400.

According to an embodiment, the user terminal 100 may transmit a user input (e.g., user utterance) to the intelligent server 200 (①). For example, the user input may be "show me a picture stored in a mobile phone on a TV."

According to an embodiment, the intelligent server 200 may generate the path rule of each of a plurality of electronic apparatuses, which corresponds to the user input. For example, the intelligent server 200 may generate a first path rule corresponding to an operation (e.g., an operation of selecting and transmitting the stored image) of the user terminal 100 and a second path rule corresponding to an operation (e.g., an operation of receiving an image and displaying the image in a display) of the external electronic apparatus 400 (e.g., TV). For example, the first path rule may include an operation in which the user terminal 100 directly transmits data to the external electronic apparatus 400.

According to an embodiment, the intelligent server 200 may determine whether the operations of the plurality of electronic apparatuses are dependent on each other. For example, the intelligent server 200 may determine that the operation of the external electronic apparatus 400 is dependent on the operation of the user terminal 100. According to an embodiment, the intelligent server 200 may determine that the user terminal 100 is a subject controlling the operations of a plurality of electronic apparatuses. For example, since the operation of the user terminal 100 for performing a task corresponding to the user input is needed, the intelligent server 200 may determine that the user terminal 100 is the subject controlling the operations of the plurality of electronic apparatuses.

According to an embodiment, the intelligent server 200 may generate a message (or a response) corresponding to a user input by using path rules of the plurality of electronic apparatuses. For example, the intelligent server 200 may generate a third path rule corresponding to the user input by using the first path rule and the second path rule. For example, the third path rule may be generated by adding the state corresponding to the operation of the dedicated app 151' of the user terminal 100 to the first path rule and the second path rule of the user terminal 100. For another example, the third path rule may be selected from the path rule set of the dedicated app 151' of the user terminal 100 by using the first path rule and the second path rule.

According to an embodiment, the intelligent server 200 may transmit the third path rule to the user terminal 100 (②).

According to an embodiment, the user terminal 100 may receive the third path rule and may generate data depending on the third path rule. For example, the user terminal 100 may execute an operation of selecting the stored image to generate (or obtain) data (e.g., image), depending on the third path rule. According to an embodiment, the user terminal 100 may transmit a command for executing an operation of the external electronic apparatus 400, depending on the third path rule (③). For example, the command may include a fourth path rule including the operation (e.g., operation of displaying an image) of the external electronic apparatus 400 (e.g., TV) and data necessary to execute the operation. Moreover, the command may include information about a device type of the external electronic apparatus 400. As such, the user terminal 100 may transmit the command to the external electronic apparatus 400 so as to have the state included in the third path rule.

According to an embodiment, the user terminal 100 may control the operation of the external electronic apparatus 400 through the dedicated app 151'. For example, the user terminal 100 may control the operation of the external electronic apparatus 400 by using the library of the external electronic apparatus 400 and a UI.

According to an embodiment, the external electronic apparatus 400 may receive the command and may execute an operation corresponding to the state included in the fourth path rule. For example, the external electronic apparatus 400 may display the image, which is received from the user terminal 100 depending on the fourth path rule, in a display. According to an embodiment, the external electronic apparatus 400 may transmit information (or information indicating that the operation is completed) about a state in which the execution of the operation is completed, to the user terminal 100 and the IoT cloud 300 (④). After receiving the state update of the external electronic apparatus 400, the IoT cloud 300 may optionally transmit the state update of the external electronic apparatus 400 to the user terminal 100 (⑤). The user terminal 100 may indicate the state of the external electronic apparatus 400 through the dedicated app 151' in a UI displayed in the display 130.

As such, the user terminal 100 may directly transmit data to the external electronic apparatus 400 and may control the operations of a plurality of electronic apparatuses (e.g., the user terminal 100 and the external electronic apparatus 400) corresponding to a user input (e.g., "show me a picture stored in a mobile phone on a TV").

Figure 14:
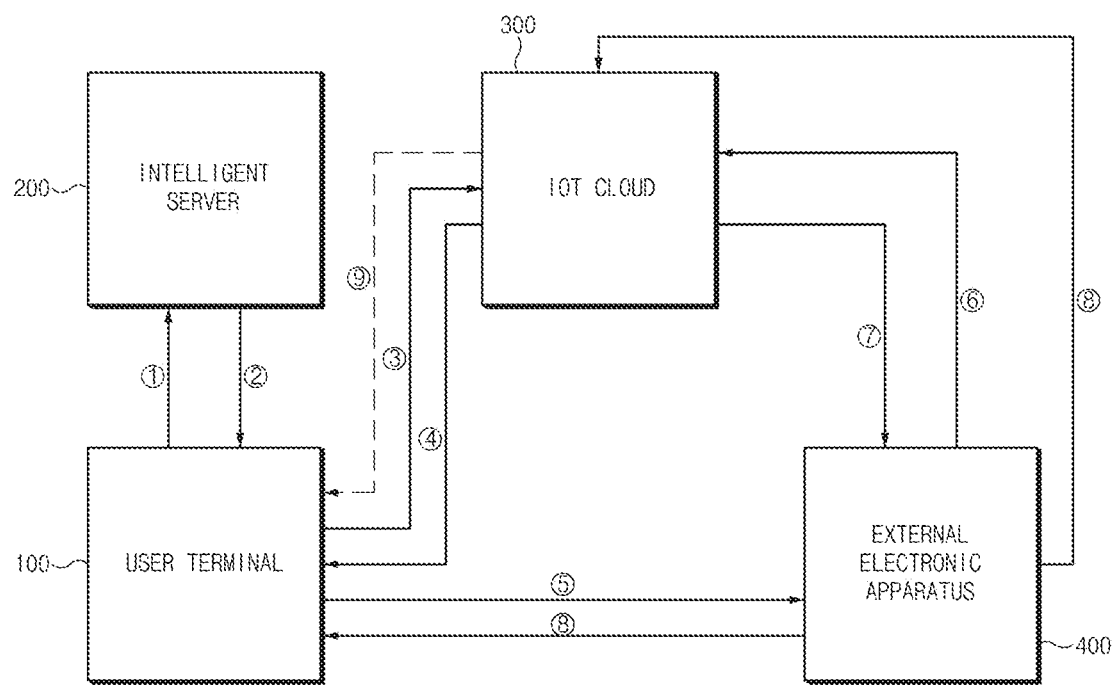
FIG. 14 is a diagram illustrating a method in which a user terminal transmits a generated data to an external electronic apparatus through an IoT cloud according to an embodiment of the disclosure.

FIG. 14 is a diagram illustrating a method in which a user terminal transmits a generated data to an external electronic apparatus through an IoT cloud according to an embodiment of the disclosure.

Referring to FIG. 14, the user terminal 100 may control the operations of a plurality of electronic apparatuses. The user terminal 100 may transmit data to the external electronic apparatus 400 through the IoT cloud 300.

According to an embodiment, the user terminal 100 may transmit a user input to the intelligent server 200 (①). For example, the user input may be "show me a picture stored in a mobile phone on a TV."

According to an embodiment, similarly to FIG. 13, the intelligent server 200 may generate a third path rule corresponding to a user input, by using a first path rule corresponding to the operation of the user terminal 100 and a second path rule corresponding to the operation of the external electronic apparatus 400 (e.g., TV). For example, the first path rule may include an operation of transmitting data to the external electronic apparatus 400 through the IoT cloud 300. According to an embodiment, the intelligent server 200 may transmit the third path rule to the user terminal 100 (②).

According to an embodiment, the user terminal 100 may receive the third path rule and may generate data depending on the third path rule. For example, the user terminal 100 may execute an operation of selecting the stored image to generate data (e.g., image), depending on the third path rule. According to an embodiment, the user terminal 100 may transmit the generated data to the IoT cloud 300 (③). According to an embodiment, the IoT cloud 300 may store the data, and may transmit information about an address (e.g., URL) at which the data is stored, to the user terminal 100 (④). According to an embodiment, the user terminal 100 may transmit a command for executing an operation of the external electronic apparatus 400 according to the third path rule (⑤). For example, the command may include a fourth path rule (or a value for performing an operation) including an operation (e.g., operation of receiving an image and displaying the image in a display) of the external electronic apparatus 400 (e.g., TV) and information about the address of the data. According to an embodiment, the user terminal 100 may control the operation of the external electronic apparatus 400 through the dedicated app 151'.

According to an embodiment, the external electronic apparatus 400 may receive the command and may transmit a request for obtaining data to the IoT cloud 300 (⑥). The request may include information about the address of the data. According to an embodiment, the IoT cloud 300 may receive the request and may transmit data stored at the address, to the external electronic apparatus 400 (⑦). According to an embodiment, the external electronic apparatus 400 may receive the data and may execute an operation included in the fourth path rule. For example, the external electronic apparatus 400 may display the image, which is received from the IoT cloud 300 depending on the fourth path rule, in a display. According to an embodiment, the external electronic apparatus 400 may transmit information about the state in which the operation is executed, to the user terminal 100 and the IoT cloud 300 (⑧). The IoT cloud 300 may optionally transmit information about the state of the external electronic apparatus 400 to the user terminal 100 (⑨). The user terminal 100 may indicate the state of the external electronic apparatus 400 through the dedicated app 151' in a UI displayed in the display 130.

As such, the user terminal 100 may transmit the generated data to the external electronic apparatus 400 through the IoT cloud 300 and may control the operations of a plurality of electronic apparatuses (e.g., the user terminal 100 and the external electronic apparatus 400) corresponding to a user input (e.g., "show me a picture stored in a mobile phone on a TV").

Figure 15:
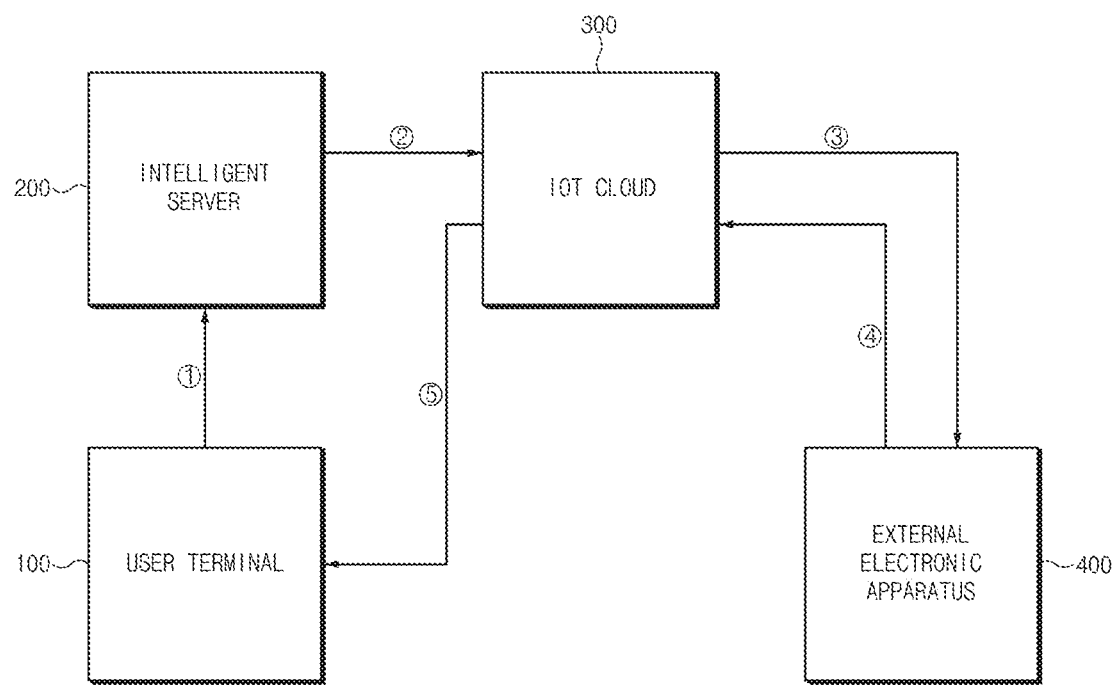
FIG. 15 is a diagram illustrating a method in which an IoT cloud controls an operation of an external electronic apparatus according to an embodiment of the disclosure.

FIG. 15 is a diagram illustrating a method in which an IoT cloud controls an operation of an external electronic apparatus according to an embodiment of the disclosure.

Referring to FIG. 15, the IoT cloud 300 may receive a path rule from the intelligent server 200 and may control the operation of the external electronic apparatus 400 depending on the received path rule.

According to an embodiment, the user terminal 100 may transmit a user input to the intelligent server 200 (①). For example, the user input may be "show me a picture stored in a TV."

According to an embodiment, the intelligent server 200 may generate a path rule corresponding to the user input. For example, the intelligent server 200 may generate a path rule corresponding to the operation (e.g., operation of displaying the stored image in a display) of the external electronic apparatus 400. According to an embodiment, the intelligent server 200 may determine that the IoT cloud 300 is a subject controlling the operation of an external electronic apparatus. For example, since the user terminal 100 and the external electronic apparatus 400 are included in different networks from each other, the intelligent server 200 may determine that the IoT cloud 300 is the subject controlling the external electronic apparatus. According to an embodiment, the intelligent server 200 may transmit the path rule to the IoT cloud 300 (②).

According to an embodiment, the IoT cloud 300 may receive the path rule and may transmit the path rule to the external electronic apparatus 400 (③). For example, the command may include a path rule including an operation (e.g., operation of receiving an image and displaying the image in a display) of the external electronic apparatus 400 (e.g., TV).

According to an embodiment, the external electronic apparatus 400 may receive the command and may execute an operation included in the path rule. For example, the external electronic apparatus 400 may display the stored image in a display depending on the path rule. According to an embodiment, the external electronic apparatus 400 may transmit information about a state in which the execution of the operation is completed, to the IoT cloud 300 (④). The IoT cloud 300 may transmit information about the state of the external electronic apparatus 400 to the user terminal 100 (⑤).

As such, the IoT cloud 300 may control the operation of the external electronic apparatus 400 corresponding to a user input (e.g., "show me a picture stored in a TV").

Figure 16A:
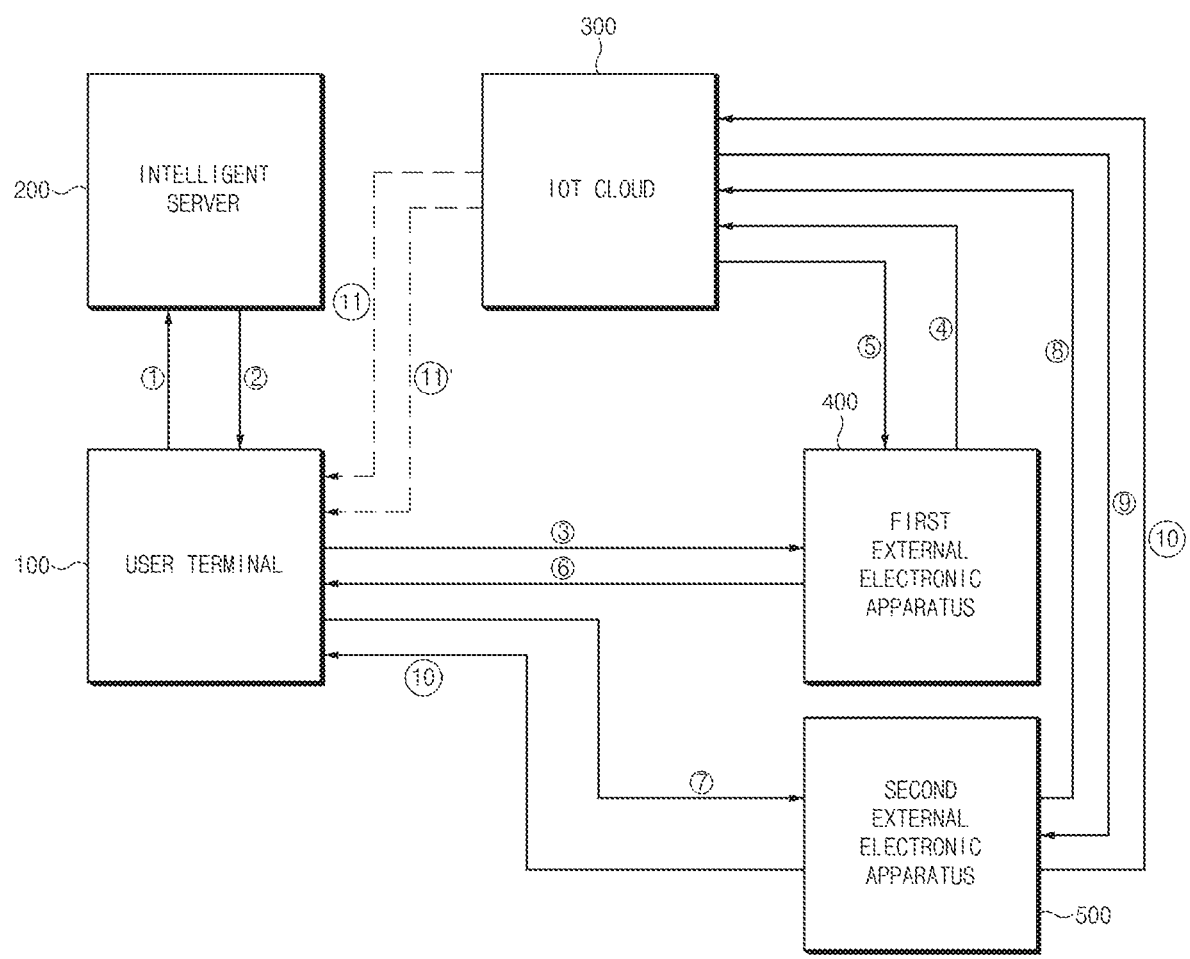
FIGS. 16A and 16B are diagrams illustrating a method in which a user terminal controls operations of a plurality of external electronic apparatuses according to an embodiment of the disclosure.
Figure 16B:
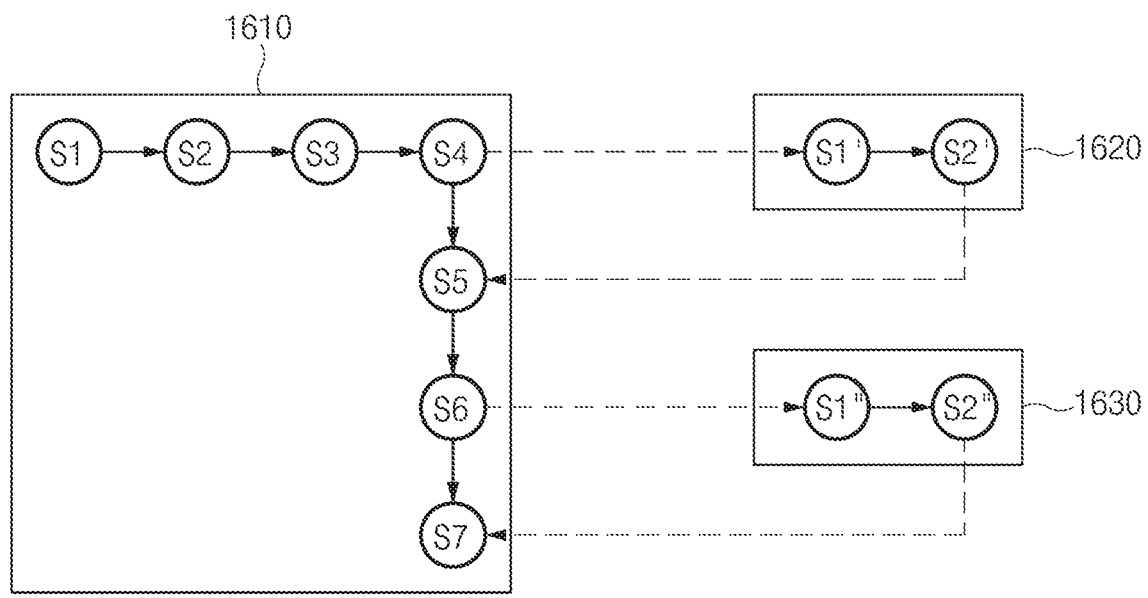

FIGS. 16A and 16B are diagrams illustrating a method in which a user terminal controls operations of a plurality of external electronic apparatuses according to an embodiment of the disclosure.

Referring to FIG. 16A, the user terminal 100 may receive a path rule from the intelligent server 200 and may control the operations of a plurality of external electronic apparatuses 400 and 500 depending on the received path rule. The operations of the plurality of external electronic apparatuses 400 and 500 may be dependent on each other.

According to an embodiment, the user terminal 100 may transmit a user input to the intelligent server 200 (①). For example, the user input may be "show me an image stored in a TV, on a refrigerator."

According to an embodiment, the intelligent server 200 may generate the path rule of each of the plurality of external electronic apparatuses 400 and 500, which corresponds to the user input. For example, the intelligent server 200 may generate a first path rule corresponding to an operation (e.g., an operation of selecting and transmitting the stored image) of the first external electronic apparatus 400 (e.g., TV) and a second path rule corresponding to an operation (e.g., an operation of receiving an image and displaying the image in a display) of the second external electronic apparatus 500 (e.g., a refrigerator including a display). For example, the first path rule may include an operation in which the first external electronic apparatus 400 transmits data to the second external electronic apparatus 500 through the IoT cloud 300.

According to an embodiment, the intelligent server 200 may determine whether the operations of the plurality of external electronic apparatuses 400 and 500 are dependent on each other. For example, the intelligent server 200 may determine that the operation of the second external electronic apparatus 500 is dependent on the operation of the first external electronic apparatus 400. According to an embodiment, the intelligent server 200 may determine that the user terminal 100 is a subject controlling operations of the plurality of external electronic apparatuses 400 and 500. For example, since the user terminal 100 receives the user input, the intelligent server 200 may determine that the user terminal 100 is the subject controlling operations of the plurality of external electronic apparatuses 400 and 500.

According to an embodiment, the intelligent server 200 may generate a path rule corresponding to the user input by using path rules of the plurality of external electronic apparatuses 400 and 500. For example, the intelligent server 200 may generate a third path rule corresponding to the user input by using the first path rule and the second path rule. For example, the third path rule may include the operation of the dedicated app 151' of the user terminal 100.

Referring to FIG. 16B, the third path rule may include states S1, S2, and S3 1610 corresponding to the operation of the dedicated app 151' for controlling the plurality of external electronic apparatuses 400 and 500, states S1' and S2' 1620 corresponding to an operation of the first external electronic apparatus 400, which selects and transmits the stored image, and states S1" and S2" 1630 corresponding to an operation of the second external electronic apparatus 500 that displays the received image in a display.

According to an embodiment, the third path rule may further include states S4, S5, S6, and S7 1610: state S4 in which a command is transmitted to the first external electronic apparatus 400, state S5 in which information about a state where the execution of an operation is completed is received from the first external electronic apparatus 400, state S6 in which a command is transmitted to the second external electronic apparatus 500, and state S7 in which information about a state where the execution of an operation is completed is received from the second external electronic apparatus 500. According to another embodiment, the third path rule may separately include information about whether the operation of the second external electronic apparatus 500 is dependent on the operation of the first external electronic apparatus 400, instead of states S4, S5, S6, and S7 where a path rule and state information are transmitted and received. As such, the user terminal 100 may control the operations of the plurality of external electronic apparatuses 400 and 500 that are dependent on each other. According to another embodiment, the third path rule may include information about whether the operation of the second external electronic apparatus 500 is dependent on the operation of the first external electronic apparatus 400, instead of states S4, S5, S6, and S7 where a path rule and state information are transmitted and received.

Referring to FIG. 16A, the intelligent server 200 may transmit the third path rule to the user terminal 100 (②).

According to an embodiment, the user terminal 100 may receive the third path rule and may transmit a first command for executing the operation of the first external electronic apparatus 400 depending on the third path rule (③). For example, the first command may include a fourth path rule including an operation (e.g., operation of selecting the stored image) of the first external electronic apparatus 400 (e.g., TV). According to an embodiment, the user terminal 100 may control the operation of the first external electronic apparatus 400 through the dedicated app 151'. For example, the user terminal 100 may control the operation of the first external electronic apparatus 400 by using the library of the first external electronic apparatus 400 and a UI.

According to an embodiment, the first external electronic apparatus 400 may receive the first command and may execute an operation included in the fourth path rule. For example, the first external electronic apparatus 400 may execute an operation of selecting the stored image to generate data (e.g., image), depending on the fourth path rule. According to an embodiment, the first external electronic apparatus 400 may transmit the generated data to the IoT cloud 300 (④). According to an embodiment, the IoT cloud 300 may store the data, and may transmit information about an address (e.g., URL) at which the data is stored, to the first external electronic apparatus 400 (⑤). According to an embodiment, the first external electronic apparatus 400 may transmit information about a state where the execution of the operation is completed and the address of the data, to the user terminal 100 (⑥), and may transmit information about a state where the operation is executed, to the IoT cloud 300. The user terminal 100 may indicate the state of the first external electronic apparatus 400 through the dedicated app 151' in the UI displayed in the display 130.

According to an embodiment, in the case where the user terminal 100 receives the information about the state where the execution of the operation is completed, the user terminal 100 may transmit a second command for executing the operation of the second external electronic apparatus 500 depending on the third path rule (⑦). For example, the second command may include a fifth path rule including an operation (e.g., operation of receiving an image and displaying the image in a display) of the second external electronic apparatus 500 (e.g., a refrigerator including a display). According to an embodiment, the user terminal 100 may control the operation of the second external electronic apparatus 500 through the dedicated app 151'. For example, the user terminal 100 may control the operation of the second external electronic apparatus 500 by using the library of the second external electronic apparatus 500 and the UI.

According to an embodiment, the second external electronic apparatus 500 may receive the second command and may transmit a request for obtaining data to the IoT cloud 300 (⑧). The request may include information about the address of the data. According to an embodiment, the IoT cloud 300 may receive the request and may transmit data stored at the address, to the second external electronic apparatus 500 (⑨). According to an embodiment, the second external electronic apparatus 500 may receive the data and may execute an operation included in the fifth path rule. For example, the second external electronic apparatus 500 may display the image, which is received from the IoT cloud 300 depending on the fifth path rule, in a display. According to an embodiment, the second external electronic apparatus 500 may transmit information about the state in which the operation is executed, to the user terminal 100 and the IoT cloud 300 (⑩). The IoT cloud 300 may optionally transmit information ⑪ about the state of the first external electronic apparatus 400 and information ⑪' about the state of the second external electronic apparatus 500 to the user terminal 100. The user terminal 100 may indicate the state of the second external electronic apparatus 500 through the dedicated app 151' in the UI displayed in the display 130.

As such, the user terminal 100 may control the operations of the plurality of external electronic apparatuses 400 and 500, which correspond to a user input (e.g., "show me an image stored in a TV, on a refrigerator") and which are dependent on each other.

Figure 17A:
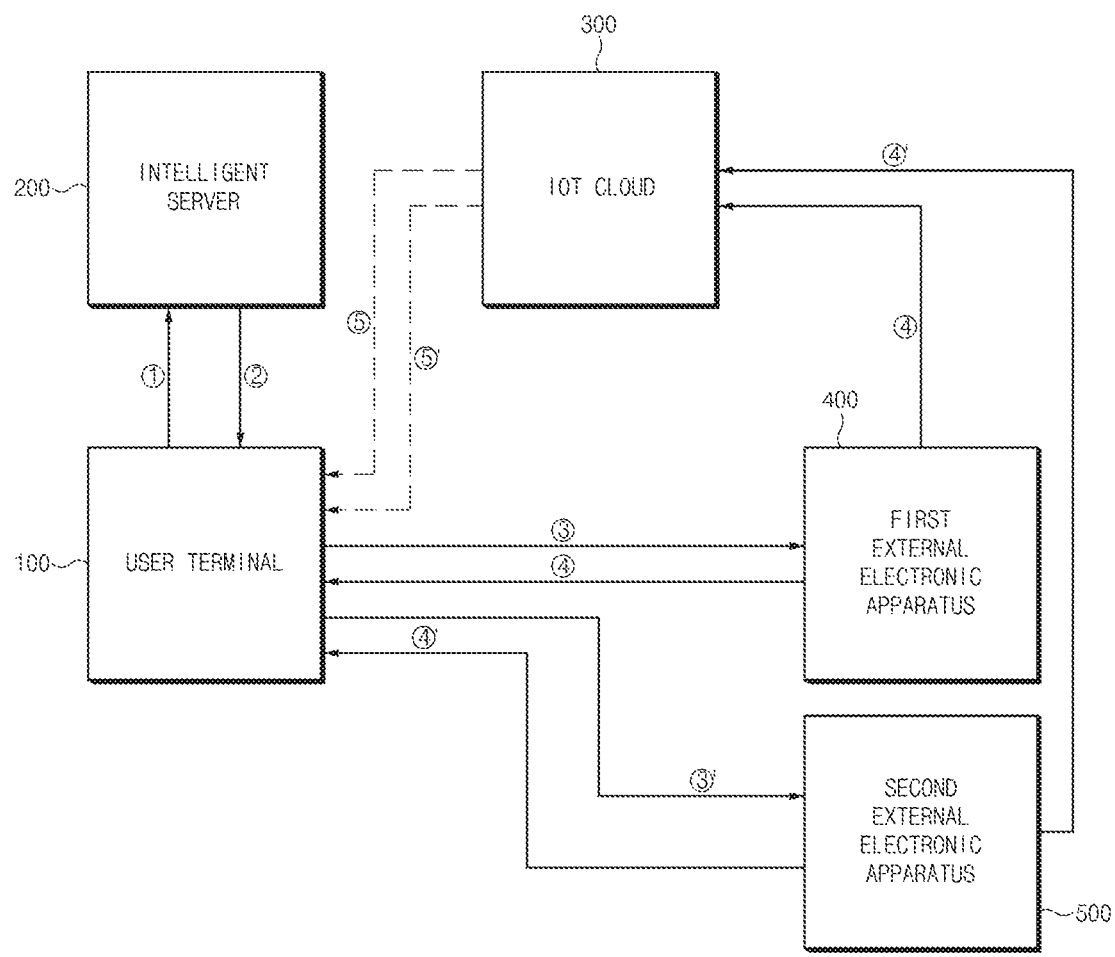
FIGS. 17A and 17B are diagrams illustrating a method in which a user terminal controls operations of a plurality of external electronic apparatuses according to an embodiment of the disclosure.
Figure 17B:
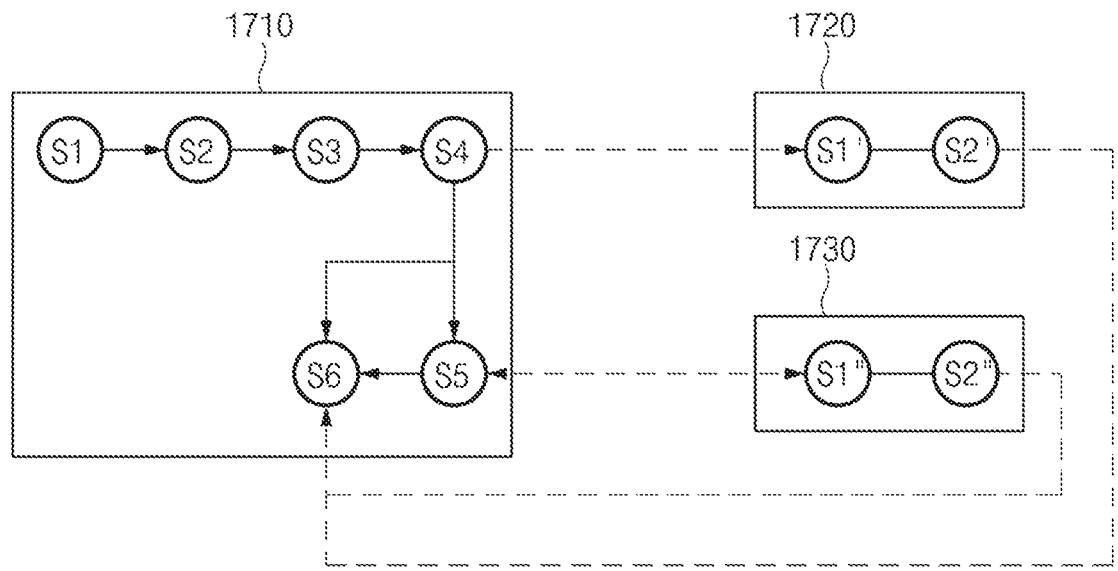

FIGS. 17A and 17B are diagrams illustrating a method in which a user terminal controls operations of a plurality of external electronic apparatuses according to an embodiment of the disclosure.

Referring to FIG. 17A, the user terminal 100 may control the operations of a plurality of electronic apparatuses. The operations of the plurality of external electronic apparatuses 400 and 500 may be independent of each other.

According to an embodiment, the user terminal 100 may transmit a user input to the intelligent server 200 (①). The user input may be "show me an image stored in a TV, on the TV and show me an image stored in a refrigerator, on the refrigerator."

According to an embodiment, the intelligent server 200 may generate the path rule of each of the plurality of external electronic apparatuses 400 and 500, which corresponds to the user input. For example, the intelligent server 200 may generate a first path rule corresponding to an operation (e.g., an operation of displaying the stored image in a display) of the first external electronic apparatus 400 (e.g., TV) and a second path rule corresponding to an operation (e.g., an operation of displaying the stored image in a display) of the second external electronic apparatus 500 (e.g., a refrigerator including a display).

According to an embodiment, the intelligent server 200 may determine whether the operations of the plurality of external electronic apparatuses 400 and 500 are dependent on each other. For example, the intelligent server 200 may determine that the operation of the first external electronic apparatus 400 is independent of the operation of the second external electronic apparatus 500. According to an embodiment, the intelligent server 200 may determine that the user terminal 100 is a subject controlling operations of the plurality of external electronic apparatuses 400 and 500. For example, since the user terminal 100 receives the user input, the intelligent server 200 may determine that the user terminal 100 is the subject controlling operations of the plurality of external electronic apparatuses 400 and 500.

According to an embodiment, the intelligent server 200 may generate a path rule corresponding to the user input by using path rules of the plurality of external electronic apparatuses 400 and 500. For example, the intelligent server 200 may generate a third path rule corresponding to the user input by using the first path rule and the second path rule. For example, the third path rule may include the operation of the dedicated app 151' of the user terminal 100.

Referring to FIG. 17B, the third path rule may include states S1, S2, and S3 1710 corresponding to the operation of the dedicated app 151' for controlling the plurality of external electronic apparatuses 400 and 500, states S1' and S2' 1720 corresponding to an operation of the first external electronic apparatus 400, which displays the stored image in a display, and states S1" and S2" 1730 corresponding to an operation of the second external electronic apparatus 500 that displays the stored image in the display. According to an embodiment, the third path rule may further include states S4, S5, and S6 1710: state S4 in which a command is transmitted to the first external electronic apparatus 400, state S5 in which a command is transmitted to the second external electronic apparatus 500, and state S6 in which information about a state where the execution of an operation is completed is received from the plurality of external electronic apparatuses 400 and 500. As such, the user terminal 100 may control the operations of the plurality of external electronic apparatuses 400 and 500 that are independent of each other.

Referring to FIG. 17A, the intelligent server 200 may transmit the third path rule to the user terminal 100 (②).

According to an embodiment, the user terminal 100 may receive the third path rule and may transmit a first command for executing the operation of the first external electronic apparatus 400 depending on the third path rule (③). For example, the first command may include a fourth path rule including an operation (e.g., operation of displaying the stored image in a display) of the first external electronic apparatus 400 (e.g., TV). According to an embodiment, the first external electronic apparatus 400 may receive the first command and may execute an operation included in the fourth path rule. For example, the first external electronic apparatus 400 may display the stored image in a display depending on the fourth path rule.

According to an embodiment, regardless of whether the execution of the operation of the first external electronic apparatus 400 is completed, the user terminal 100 may transmit a second command for executing the operation of the second external electronic apparatus 500 depending on the third path rule (③'). For example, the second command may include a fifth path rule including an operation (e.g., operation of displaying the stored image in a display) of the second external electronic apparatus 500 (e.g., a refrigerator including a display). According to an embodiment, the second external electronic apparatus 500 may receive the second command and may execute an operation included in the fifth path rule. For example, the second external electronic apparatus 500 may display the stored image in a display depending on the fifth path rule.

According to an embodiment, the plurality of external electronic apparatuses 400 and 500 may transmit information about the state in which the execution of the operation is completed, to the user terminal 100 and the IoT cloud 300 (④ and ④'), respectively. The IoT cloud 300 may optionally transmit information ⑤ about the state of the first external electronic apparatus 400 and information ⑤' about the state of the second external electronic apparatus 500 to the user terminal 100. The user terminal 100 may indicate the states of the plurality of external electronic apparatuses 400 and 500 through the dedicated app 151' in a UI displayed in the display 130.

As such, the user terminal 100 may control the operations of the plurality of external electronic apparatuses 400 and 500, which correspond to a user input (e.g., "show me an image stored in a TV, on the TV and show me an image stored in a refrigerator, on the refrigerator") and which are independent of each other.

Figure 18A:
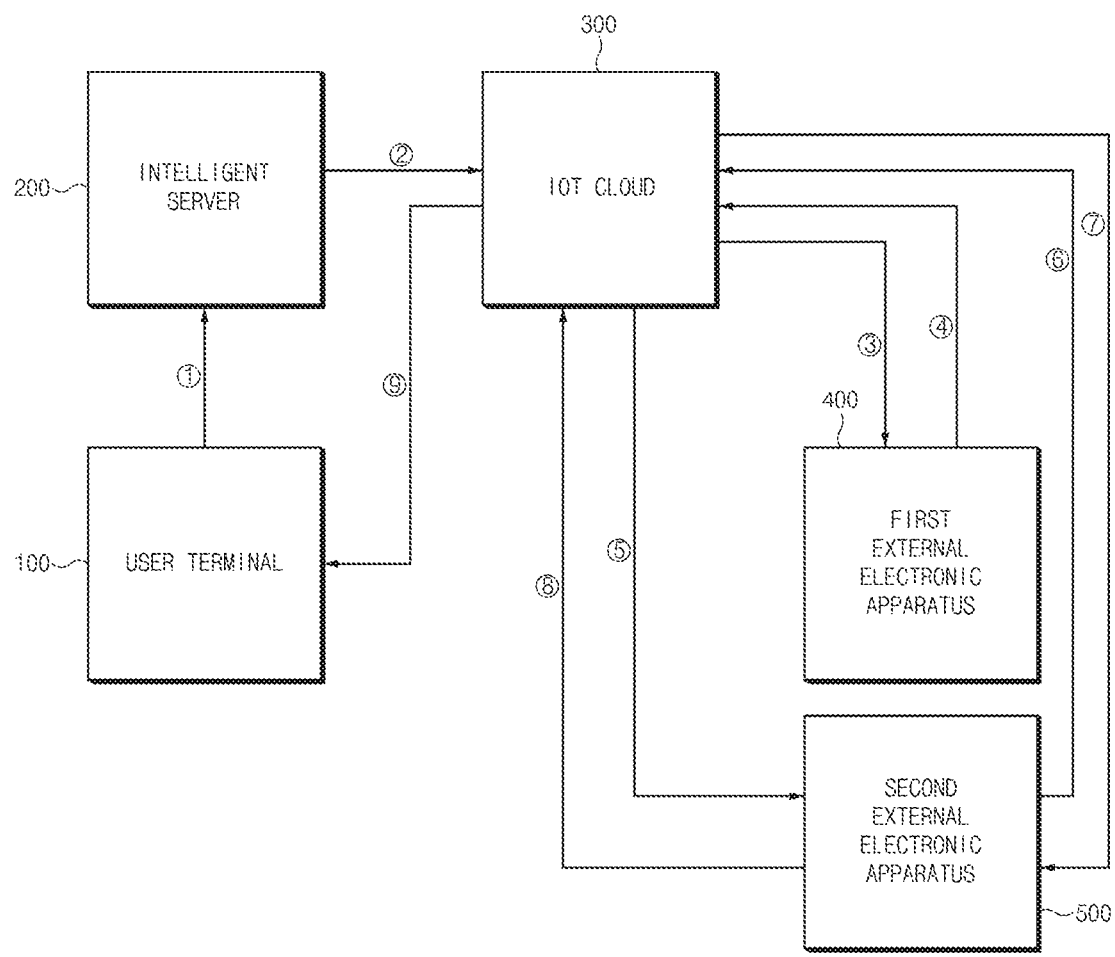
FIGS. 18A and 18B are diagrams illustrating a method in which an IoT cloud controls operations of a plurality of external electronic apparatuses according to an embodiment of the disclosure.
Figure 18B:
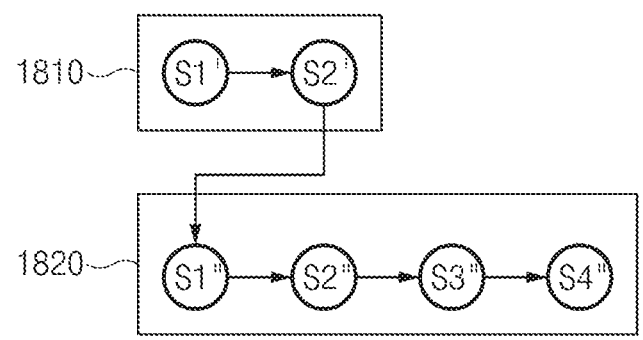

FIGS. 18A and 18B are diagrams illustrating a method in which an IoT cloud controls operations of a plurality of external electronic apparatuses according to an embodiment of the disclosure.

Referring to FIG. 18A, the IoT cloud 300 may control the operations of the plurality of external electronic apparatuses 400 and 500. The operations of the plurality of external electronic apparatuses 400 and 500 may be dependent on each other.

According to an embodiment, the user terminal 100 may transmit a user input to the intelligent server 200 (①). For example, the user input may be "show me an image stored in a TV, on a refrigerator."

According to an embodiment, the intelligent server 200 may generate the path rule of each of the plurality of external electronic apparatuses 400 and 500, which corresponds to the user input. For example, the intelligent server 200 may generate a first path rule corresponding to an operation (e.g., an operation of selecting and transmitting the stored image) of the first external electronic apparatus 400 (e.g., TV) and a second path rule corresponding to an operation (e.g., an operation of receiving an image and displaying the image in a display) of the second external electronic apparatus 500 (e.g., a refrigerator including a display). For example, the first path rule may include an operation in which the first external electronic apparatus 400 transmits data to the second external electronic apparatus 500 through the IoT cloud 300.

According to an embodiment, the intelligent server 200 may determine whether the operations of the plurality of external electronic apparatuses 400 and 500 are dependent on each other. For example, the intelligent server 200 may determine that the operation of the second external electronic apparatus 500 is dependent on the operation of the first external electronic apparatus 400. According to an embodiment, the intelligent server 200 may determine that the IoT cloud 300 is a subject controlling operations of the plurality of external electronic apparatuses 400 and 500. For example, since the user terminal 100 and the plurality of external electronic apparatuses 400 and 500 are included in different networks from each other, the intelligent server 200 may determine that the IoT cloud 300 is the subject controlling the external electronic apparatus.

According to an embodiment, the intelligent server 200 may generate a path rule corresponding to the user input by using path rules of the plurality of external electronic apparatuses 400 and 500. For example, the intelligent server 200 may generate a third path rule corresponding to the user input by using the first path rule and the second path rule.

Referring to FIG. 18B, the third path rule may include states S1' and S2' 1810 corresponding to an operation of the first external electronic apparatus 400, which selects and transmits the stored image, and states S1", S2", S3", and S4" 1820 corresponding to an operation of the second external electronic apparatus 500 that displays the received image in a display.

Referring to FIG. 18A, the intelligent server 200 may transmit the third path rule to the IoT cloud 300 (②).

According to an embodiment, the IoT cloud 300 may receive the third path rule and may transmit a first command for executing the operation of the first external electronic apparatus 400 depending on the third path rule (③). For example, the first command may include a fourth path rule including an operation (e.g., an operation of selecting and transmitting the stored image) of the first external electronic apparatus 400 (e.g., TV).

According to an embodiment, the first external electronic apparatus 400 may receive the first command and may execute an operation included in the fourth path rule. For example, the first external electronic apparatus 400 may execute an operation of selecting the stored image to generate data (e.g., image), depending on the fourth path rule. According to an embodiment, the first external electronic apparatus 400 may transmit the generated data and information about a state in which the execution of the operation is completed, to the IoT cloud 300 (④). According to an embodiment, in the case where the IoT cloud 300 stores the data and receives the information about the state where the execution of the operation is completed, the IoT cloud 300 may transmit a second command for executing the operation of the second external electronic apparatus 500 depending on the third path rule (⑤). For example, the second command may include the fifth path rule including the operation (e.g., an operation of displaying the received image in a display) of the second the external electronic apparatus 400 (e.g., a refrigerator including a display) and information about an address (e.g., URL) in which the data is stored.

According to an embodiment, the second external electronic apparatus 500 may receive the second command and may transmit a request for obtaining data to the IoT cloud 300 (⑥). The request may include information about the address of the data. According to an embodiment, the IoT cloud 300 may receive the request and may transmit data stored at the address to the second external electronic apparatus 500 (⑦). According to an embodiment, the second external electronic apparatus 500 may receive the data and may display the image, which is received from the IoT cloud 300 depending on the fifth path rule, in a display. According to an embodiment, the second external electronic apparatus 500 may transmit information about the state in which the operation is executed, to the user terminal 100 and the IoT cloud 300 (⑧). The IoT cloud 300 may transmit information about the state of the second external electronic apparatus 500 to the user terminal 100 (⑨).

As such, the IoT cloud 300 may control the operations of the plurality of external electronic apparatuses 400 and 500, which correspond to a user input (e.g., "show me an image stored in a TV, on a refrigerator") and which are dependent on each other.

Figure 19:
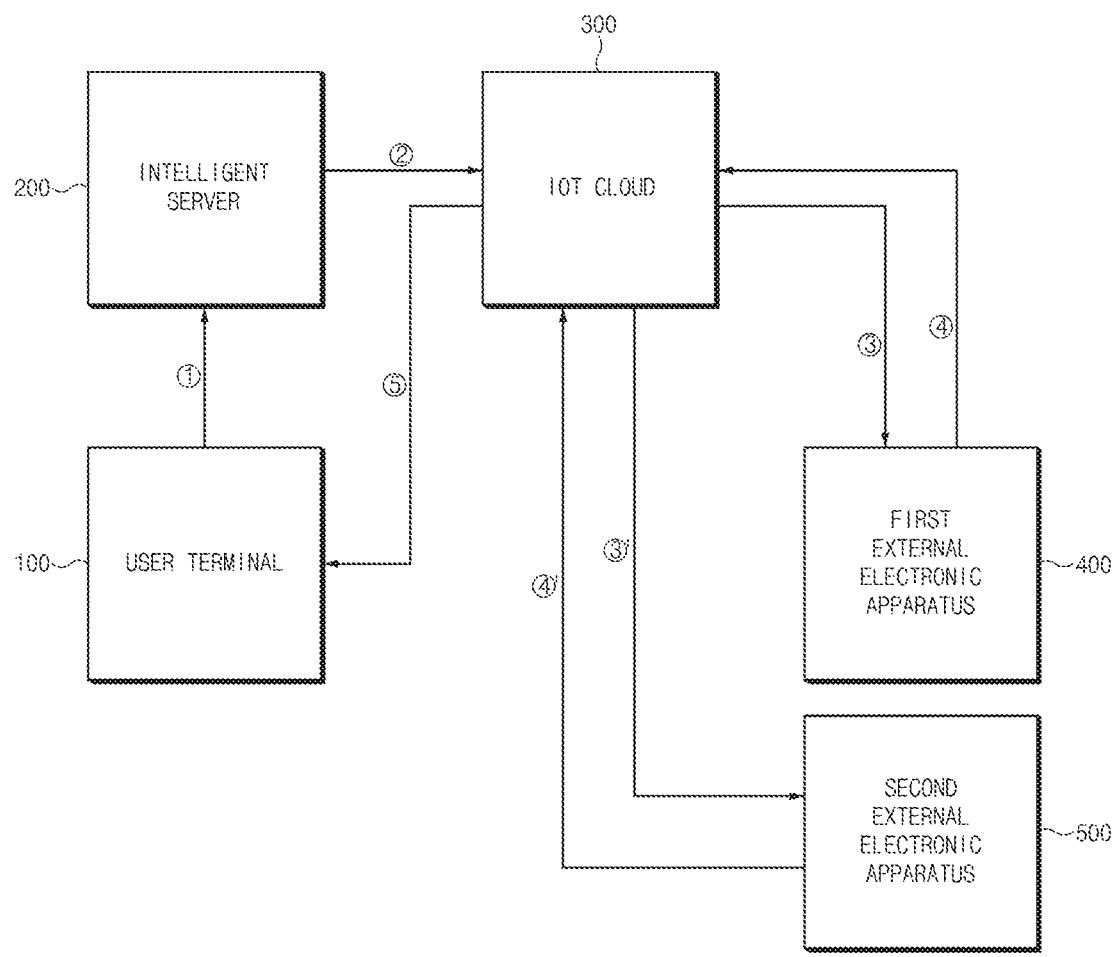
FIG. 19 is a diagram illustrating a method in which an IoT cloud controls operations of a plurality of external electronic apparatuses according to an embodiment of the disclosure.

FIG. 19 is a diagram illustrating a method in which an IoT cloud controls operations of a plurality of external electronic apparatuses according to an embodiment of the disclosure.

Referring to FIG. 19, the IoT cloud 300 may control the operations of a plurality of external electronic apparatuses. The operations of the plurality of external electronic apparatuses 400 and 500 may be independent of each other.

According to an embodiment, the user terminal 100 may transmit a user input to the intelligent server 200 (①). The user input may be "show me an image stored in a TV, on the TV and show me an image stored in a refrigerator, on the refrigerator."

According to an embodiment, the intelligent server 200 may generate the path rule of each of the plurality of external electronic apparatuses 400 and 500, which corresponds to the user input. For example, the intelligent server 200 may generate a first path rule corresponding to an operation (e.g., an operation of displaying the stored image in a display) of the first external electronic apparatus 400 (e.g., TV) and a second path rule corresponding to an operation (e.g., an operation of displaying the stored image in a display) of the second external electronic apparatus 500 (e.g., a refrigerator including a display).

According to an embodiment, the intelligent server 200 may determine whether the operations of the plurality of external electronic apparatuses 400 and 500 are dependent on each other. For example, the intelligent server 200 may determine that the operation of the first external electronic apparatus 400 is independent of the operation of the second external electronic apparatus 500. According to an embodiment, the intelligent server 200 may determine that the IoT cloud 300 is a subject controlling operations of the plurality of external electronic apparatuses 400 and 500. For example, since the user terminal 100 and the plurality of external electronic apparatuses 400 and 500 are included in different networks from each other, the intelligent server 200 may determine that the IoT cloud 300 is the subject controlling the external electronic apparatus.

According to an embodiment, the intelligent server 200 may generate a path rule corresponding to the user input by using path rules of the plurality of external electronic apparatuses 400 and 500. For example, the intelligent server 200 may generate a third path rule corresponding to the user input by using the first path rule and the second path rule. According to an embodiment, the intelligent server 200 may transmit the third path rule to the IoT cloud 300 (②).

According to an embodiment, the IoT cloud 300 may receive the third path rule and may transmit a first command for executing the operation of the first external electronic apparatus 400 depending on the third path rule (③). For example, the first command may include a fourth path rule including an operation (e.g., operation of displaying the stored image in a display) of the first external electronic apparatus 400 (e.g., TV). According to an embodiment, the first external electronic apparatus 400 may receive the first command and may execute an operation included in the fourth path rule. For example, the first external electronic apparatus 400 may display the stored image in a display depending on the fourth path rule.

According to an embodiment, regardless of whether the execution of the operation of the first external electronic apparatus 400 is completed, the IoT cloud 300 may transmit a second command for executing the operation of the second external electronic apparatus 500 depending on the third path rule (③'). For example, the second command may include a fifth path rule including an operation (e.g., operation of displaying the stored image in a display) of the second external electronic apparatus 500 (e.g., a refrigerator including a display). According to an embodiment, the second external electronic apparatus 500 may receive the second command and may execute an operation included in the fifth path rule. For example, the second external electronic apparatus 500 may display the stored image in a display depending on the fifth path rule.

According to an embodiment, the plurality of external electronic apparatuses 400 and 500 may transmit information about the state in which the execution of the operation is completed, to the user terminal 100 and the IoT cloud 300 (④ and ④'), respectively. For example, the plurality of external electronic apparatuses 400 and 500 may transmit information about the state in which the execution of the operation is completed, to the user terminal 100 and the IoT cloud 300, respectively. The IoT cloud 300 may transmit information about the state of the plurality of external electronic apparatuses 400 and 500 to the user terminal 100 (⑤).

As such, the IoT cloud 300 may control the operations of the plurality of external electronic apparatuses 400 and 500, which correspond to a user input (e.g., "show me an image stored in a TV, on the TV and show me an image stored in a refrigerator, on the refrigerator") and which are independent of each other.

Figure 20A:
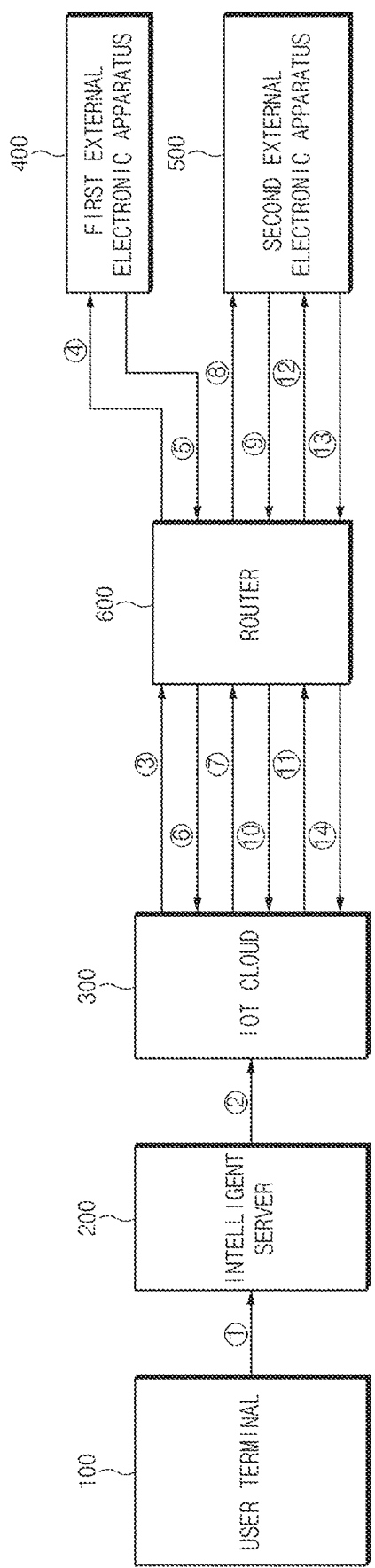
FIGS. 20A and 20B are diagrams illustrating a method in which an IoT cloud controls operations of a plurality of external electronic apparatuses through a router according to an embodiment of the disclosure.
Figure 20B:
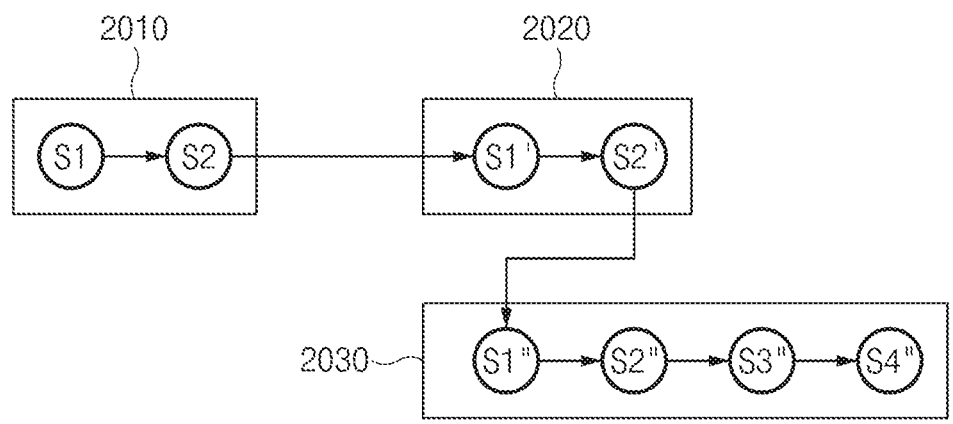

FIGS. 20A and 20B are diagrams illustrating a method in which an IoT cloud controls operations of a plurality of external electronic apparatuses through a router according to an embodiment of the disclosure.

Referring to FIG. 20A, the IoT cloud 300 may receive a path rule from the intelligent server 200 and may control the operations of a plurality of external electronic apparatuses 400 and 500 through a router 600 depending on the received path rule.

According to an embodiment, the user terminal 100 may transmit a user input to the intelligent server 200 (①). For example, the user input may be "show me an image stored in a TV, on a refrigerator."

According to an embodiment, similarly to the intelligent server 200 of FIG. 18A, the intelligent server 200 may generate a third path rule corresponding to a user input by using a first path rule corresponding to an operation (e.g., an operation of selecting and transmitting the stored image) of the first external electronic apparatus 400 (e.g., TV) and a second path rule corresponding to an operation (e.g., an operation of receiving an image and displaying the image in a display) of the second external electronic apparatus 500 (e.g., a refrigerator including a display). For example, the third path rule may include the operation of the IoT cloud 300 for controlling the operations of the plurality of external electronic apparatuses 400 and 500 through the router 600.

Referring to FIG. 20B, similarly to the third path rule of FIG. 18B, the third path rule may include states S1' and S2' 2020 corresponding to an operation of the first external electronic apparatus 400, which selects and transmits the stored image, and states S1", S2", S3", and S4" 2030 corresponding to an operation of the second external electronic apparatus 500 that displays the received image in a display. The third path rule may further include states S1 and S2 2010 corresponding to an operation of establishing the connection to the router 600 such that the IoT cloud 300 transmits and/or receives a command or data. As such, the intelligent server 200 may control the operations of the plurality of external electronic apparatuses 400 and 500 that are dependent on each other.

Referring to FIG. 20A, the intelligent server 200 may transmit the third path rule to the IoT cloud 300 (②).

According to an embodiment, the IoT cloud 300 may receive the third path rule and may perform an operation depending on the third path rule. For example, the IoT cloud 300 may perform the operation depending on the third path rule to establish the connection to the router 600. According to an embodiment, the IoT cloud 300 may transmit a fourth path rule including the operations of the plurality of external electronic apparatuses 400 and 500 to the router 600 (③). According to an embodiment, the router 600 may transmit a first command for operating the first external electronic apparatus 400, depending on the fourth path rule (④). For example, the first command may include a fifth path rule including an operation (e.g., an operation of selecting and transmitting the stored image) of the first external electronic apparatus 400 (e.g., TV).

According to an embodiment, the first external electronic apparatus 400 may receive the first command and may execute an operation included in the fifth path rule. For example, the first external electronic apparatus 400 may execute an operation of selecting the stored image to generate data (e.g., image), depending on the fifth path rule. According to an embodiment, the first external electronic apparatus 400 may transmit the generated data and information about a state in which the execution of the operation is completed, to the router 600 (⑤). The router 600 may transmit the data to the IoT cloud 300 (⑥). According to an embodiment, the IoT cloud 300 may store the data, and may transmit information about an address (e.g., URL) at which the data is stored, to the router 600 (⑦). According to an embodiment, in the case where the router 600 receives information about the state in which the execution of the operation of the first external electronic apparatus 400 is completed, the router 600 may transmit a second command for executing the operation of the second external electronic apparatus 500, depending on the fourth path rule. For example, the second command may include the sixth path rule including the operation (e.g., an operation of displaying the received image) of the second external electronic apparatus 500 (e.g., refrigerator) and information about an address (e.g., URL) in which the data is stored.

According to an embodiment, the second external electronic apparatus 500 may receive the second command and may transmit a request for obtaining data, to the router 600 (⑨). The request may include information about the address of the data. The router 600 may transmit the request to the IoT cloud 300 (⑩). According to an embodiment, the IoT cloud 300 may receive the request and may transmit data stored at the address, to the router 600 (⑪). The router 600 may transmit the data to the second external electronic apparatus 500 (⑫). According to an embodiment, the second external electronic apparatus 500 may receive the data and may execute an operation included in the sixth path rule. For example, the second external electronic apparatus 500 may display the image, which is received from the router 600 depending on the sixth path rule, in a display. According to an embodiment, the second external electronic apparatus 500 may transmit the information about the state in which the execution of the operation is completed, to the router 600 (⑬). The router 600 may transmit the state of the second external electronic apparatus 500 to the IoT cloud 300 (⑭).

As such, the IoT cloud 300 may control the operations of the plurality of external electronic apparatuses 400 and 500 through the router 600.

According to various embodiments of the disclosure described with reference to FIGS. 1 to 20B, the user terminal 100 receives a path rule in which the states of the user terminal 100 or the external electronic apparatus 400 are sequentially arranged, through the intelligent server 200 and may execute the operation of the app 151 or 153 stored in the memory 150 or the external electronic apparatus 400 depending on the received path rule to perform a task corresponding to a user input.

In addition, in the case where the user terminal 100 receives a user input for performing the operations of a plurality of electronic apparatuses, the user terminal 100 may determine whether the operations of the plurality of electronic apparatuses are dependent, through the intelligent server 200, may determine the subject controlling the operations of the plurality of electronic apparatuses, may determine a method of transmitting and/or receiving data between the plurality of electronic apparatuses, and may organically control the operations of the plurality of electronic apparatuses for processing a user input.

According to various embodiments, an electronic apparatus may include a housing, a touch screen display positioned inside the housing and exposed through a first portion of the housing, a microphone positioned inside the housing and exposed through a second portion of the housing, a communication circuit positioned inside the housing, a processor positioned inside the housing and electrically connected to the touch screen display, the microphone, and the communication circuit, and a memory positioned in the housing and electrically connected with the processor. The memory may store an instruction that, when executed, causes the processor to receive a user input through at least one of the touch screen display and the microphone, to transmit first data associated with the user input to an external server through the communication circuit, to receive information including a sequence of states of each of the first external electronic apparatus and the second external electronic apparatus, from the external server through the communication circuit, to transmit a first command that allows the first external electronic apparatus to have the states of the first external electronic apparatus included in the information, to the first external electronic apparatus, and to transmit a second command that allows the second external electronic apparatus to have the states of the second external electronic apparatus included in the information, to the second external electronic apparatus. The user input may include a request for performing at least one task by using a first external electronic apparatus and a second external electronic apparatus.

According to various embodiments, the first command may include the sequence of the states of the first external electronic apparatus, and the second command may include the sequence of the states of the second external electronic apparatus.

According to various embodiments, the memory may store an instruction that, when executed, causes the processor to obtain second data by allowing the first external electronic apparatus to have the states of the first external electronic apparatus included in the information depending on the first command, and to transmit the second data together with the second command to the second external electronic apparatus to use the second data when the second external electronic apparatus performs an operation of having the states of the second external electronic apparatus, which is included in the information, depending on the second command According to various embodiments, when the first external electronic apparatus and the second external electronic apparatus are included in a local network, the first command may allow the first external electronic apparatus to directly transmit the second data to the second external electronic apparatus.

According to various embodiments, the instruction may cause the processor to display the states of the first external electronic apparatus and the states of the second external electronic apparatus, which respectively operate depending on the first command and the second command, in the touch screen display.

According to various embodiments, the instruction may cause the processor, when the first external electronic apparatus and the second external electronic apparatus complete an operation for having the states included in the information, to receive information indicating that the operation has been completed, from the first external electronic apparatus and the second external electronic apparatus.

According to various embodiments, the information may include the state of the electronic apparatus for verifying that the information indicating that the operation has been completed is received from the first external electronic apparatus and the second external electronic apparatus.

According to various embodiments, the instruction may cause the processor to determine whether an operation of the second external electronic apparatus for having the states of the second external electronic apparatus included in the sequence is dependent on an operation of the first external electronic apparatus for having the states of the first external electronic apparatus included in the sequence; and, when the operation of the second external electronic apparatus is dependent on the operation of the first external electronic apparatus, to transmit the second command to the second external electronic apparatus after verifying that the operation of the first external electronic apparatus is completed.

According to various embodiments, a server may include a network interface, at least one processor operatively connected to the network interface, and at least one memory operatively connected to the processor. The memory may store an instruction that, when executed, causes the processor to receive first data associated with a user input obtained through a microphone, from a first external electronic apparatus including the microphone through the network interface, to determine a sequence of states of each of the second external electronic apparatus and the third external electronic apparatus, for performing the at least one task; and to transmit information about the sequence to the first external electronic apparatus or an external server controlling the second external electronic apparatus and the third external electronic apparatus. The user input may include a request for performing at least one task by using a second external electronic apparatus and a third external electronic apparatus. The information may include a first command for having the states of the second external electronic apparatus included in the sequence and a second command for having the states of the third external electronic apparatus included in the sequence.

According to various embodiments, the first command may include the sequence of the states of the second external electronic apparatus, and the second command may include the sequence of the states of the third external electronic apparatus.

According to various embodiments, the information about the sequence may include a data packet including a header and a field indicating a plurality of commands.

According to various embodiments, the information about the sequence may be provided in a JavaScript object notation (JSON) format.

According to various embodiments, the information about the sequence may include relationship or dependency between the first command and the second command.

According to various embodiments, the first command may include a first device type associated with the second external electronic apparatus and a second device type associated with the third external electronic apparatus.

According to various embodiments, the instruction may cause the processor, when the first external electronic apparatus and the second external electronic apparatus or the third external electronic apparatus are not included in a local network, to transmit the information about the sequence to the external server.

According to various embodiments, the first command may allow the second external electronic apparatus to have the states of the second external electronic apparatus included in the sequence, to generate second data and allows the second external electronic apparatus to transmit the second data to the third external electronic apparatus, and the second command may use the second data, when the third external electronic apparatus performs an operation for having the states of the third external electronic apparatus included in the sequence.

According to various embodiments, when the second external electronic device and the third external electronic device are included in a local network, the first command may allow the first external electronic device to directly transmit the second data to the third external electronic device.

According to various embodiments, a server may include a network interface, at least one processor operatively connected to the network interface, and at least one memory operatively connected to the processor. The memory may store an instruction that, when executed, causes the processor to connect to a first IoT device and a second IoT device through the network interface, to receive information about a sequence of states of each of the first IoT device and the second IoT device, for performing at least one task, from an external server through the network interface, to provide the first command to the first IoT device and provide the second command to the second IoT device, based at least partly on the sequence, to receive information about at least one state from the first IoT device and/or the second IoT device, and after receiving update of the at least one state, to transmit the update of the at least one state to at least one of the external server and an external portable device through the network interface. The information may include a first command for the first IoT device and a second command for the second IoT device.

According to various embodiments, the instruction may cause the processor to provide the first command to the first IoT device, after providing the first command, to receive a first state update from the first IoT device, after receiving the first state update, to provide the second command to the second IoT device, and after providing the second command, to receive a second state update from the second IoT device.

According to various embodiments, the first command may include the sequence of the states of the first IoT device, and the second command may include the sequence of the states of the second IoT device.

According to various embodiments, an electronic apparatus may include a housing, a touch screen display positioned inside the housing and exposed through a first portion of the housing, a microphone positioned inside the housing and exposed through a second portion of the housing, a communication circuit positioned inside the housing, a processor positioned inside the housing and electrically connected to the touch screen display, the microphone, and the communication circuit, and a memory positioned in the housing and electrically connected with the processor. The memory may store an instruction that, when executed, causes the processor to receive a user input through at least one of the touch screen display and the microphone, to transmit first data associated with the user input to an external server through the communication circuit, to receive information including a sequence of states of each of the electronic apparatus and the external electronic apparatus, from the external server through the communication circuit, to perform an operation, which allows the electronic device to have the states of the electronic device included in the information, and to transmit a command for having the states of the external electronic device included in the information to the external electronic device to perform the task. The user input may include a request for performing at least one task by using the electronic apparatus and an external electronic apparatus.

According to various embodiments, a server may include at least one processor operatively connected to the network interface, and at least one memory operatively connected to the processor. The memory may store an instruction that, when executed, causes the processor to receive first data associated with a user input obtained through a microphone, from a first external electronic apparatus including the microphone through the network interface, to determine a sequence of states of each of the first external electronic apparatus and the second external electronic apparatus, for performing the at least one task; and to transmit information about the sequence to the first external electronic apparatus or an external server controlling the first external electronic apparatus and the second external electronic apparatus. The user input may include a request for performing at least one task by using the first external electronic apparatus and the second external electronic apparatus. The information may include a first command for having the states of the first external electronic apparatus included in the information and a second command included in the information.

FIG. 21 illustrates a block diagram of an electronic apparatus in a network environment according to various embodiments of the disclosure.

Referring to FIG. 21, an electronic apparatus 2101 in a network environment 2100 according to various embodiments of this disclosure may include various forms of devices. For example, the electronic apparatus may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or motion picture experts group (MPEG-1 or MPEG-2) audio layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). According to various embodiments, the electronic apparatus may include at least one of, for example, televisions (TVs), digital versatile disc (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic apparatus may include at least one of navigation devices, satellite navigation system (e.g., global navigation satellite system (GNSS)), event data recorders (EDRs) (e.g., black box for a car, a ship, or a plane), vehicle infotainment devices (e.g., head-up display for vehicle), industrial or home robots, drones, automated teller machines (ATMs), points of sales (POSs), measuring instruments (e.g., water meters, electricity meters, or gas meters), or internet of things (e.g., light bulbs, sprinkler devices, fire alarms, thermostats, or street lamps). The electronic apparatus according to an embodiment of this disclosure may not be limited to the above-described devices, and may provide functions of a plurality of devices like smartphones which have measurement function of personal biometric information (e.g., heart rate or blood glucose). In this disclosure, the term "user" may refer to a person who uses an electronic apparatus or may refer to a device (e.g., an artificial intelligence electronic apparatus) that uses the electronic apparatus.

Referring to FIG. 21, under the network environment 2100, the electronic apparatus 2101 (e.g., the user terminal 100) may communicate with an electronic apparatus 2102 through a first network 2198 using local wireless communication or may communication with an electronic apparatus 2104 (e.g., the external electronic apparatus 400) or a server 2108 (e.g., the intelligent server 200 or the IoT cloud 300) through a second network 2199. According to an embodiment, the electronic apparatus 2101 may communicate with the electronic apparatus 2104 through the server 2108.

According to an embodiment, the electronic apparatus 2101 may include a bus 2110, a processor 2120 (e.g., the processor 160), a memory 2130 (e.g., the memory 150), an input device 2150 (e.g., a micro-phone or a mouse) (e.g., the input module 110 of FIG. 2), a display device 2160, an audio module 2170, a sensor module 2176, an interface 2177, a haptic module 2179, a camera module 2180, a power management module 2188, a battery 2189, a communication module 2190 (e.g., the communication module 120), and a subscriber identification module 2196. According to an embodiment, the electronic apparatus 2101 may not include at least one (e.g., the display device 2160 or the camera module 2180) of the above-described components or may further include other component(s).

The bus 2110 may interconnect the above-described components 2120 to 2190 and may include a circuit for conveying signals (e.g., a control message or data) between the above-described components.

The processor 2120 may include one or more of a central processing unit (CPU), an application processor (AP), a graphic processing unit (GPU), an image signal processor (ISP) of a camera or a communication processor (CP). According to an embodiment, the processor 2120 may be implemented with a system on chip (SoC) or a system in package (SiP). For example, the processor 2120 may drive an operating system (OS) or an application program to control at least one of another component (e.g., hardware or software component) of the electronic apparatus 2101 connected to the processor 2120 and may process and compute various data. The processor 2120 may load a command or data, which is received from at least one of other components (e.g., the communication module 2190), into a volatile memory 2132 to process the command or data and may store the result data into a nonvolatile memory 2134.

The memory 2130 may include, for example, the volatile memory 2132 or the nonvolatile memory 2134. The volatile memory 2132 may include, for example, a random access memory (RAM) (e.g., a dynamic RAM (DRAM), a static RAM (SRAM), or a synchronous DRAM (SDRAM)). The nonvolatile memory 2134 may include, for example, a read-only memory (ROM), a programmable ROM (PROM), an one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 2134 may be configured in the form of an internal memory 2136 or the form of an external memory 2138 which is available through connection only if necessary, according to the connection with the electronic apparatus 2101. The external memory 2138 may further include a flash drive such as compact flash (CF), secure digital (SD), micro secure digital (Micro-SD), mini secure digital (Mini-SD), extreme digital (xD), a multimedia card (MMC), or a memory stick. The external memory 2138 may be operatively or physically connected with the electronic apparatus 2101 in a wired manner (e.g., a cable or a universal serial bus (USB)) or a wireless (e.g., Bluetooth) manner.

For example, the memory 2130 may store, for example, at least one different software component, such as a command or data associated with the program 2140, of the electronic apparatus 2101. The program 2140 may include, for example, a kernel 2141, a library 2143, an application framework 2145 or an application program (interchangeably, "application") 2147.

The input device 2150 may include a microphone, a mouse, or a keyboard. According to an embodiment, the keyboard may include a keyboard physically connected or a virtual keyboard displayed through the display device 2160.

The display device 2160 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic apparatus 2101.

The audio module 2170 may convert, for example, from a sound into an electrical signal or from an electrical signal into the sound. According to an embodiment, the audio module 2170 may acquire sound through the input device 2150 (e.g., a microphone) or may output sound through an output device (not illustrated) (e.g., a speaker or a receiver) included in the electronic apparatus 2101, an external electronic apparatus (e.g., the electronic apparatus 2102 (e.g., a wireless speaker or a wireless headphone)) or an electronic apparatus 2106 (e.g., a wired speaker or a wired headphone) connected with the electronic apparatus 2101.

The sensor module 2176 may measure or detect, for example, an internal operating state (e.g., power or temperature) of the electronic apparatus 2101 or an external environment state (e.g., an altitude, a humidity, or brightness) to generate an electrical signal or a data value corresponding to the information of the measured state or the detected state. The sensor module 2176 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an ultraviolet (UV) sensor. The sensor module 2176 may further include a control circuit for controlling at least one or more sensors included therein. According to an embodiment, the electronic apparatus 2101 may control the sensor module 2176 by using the processor 2120 or a processor (e.g., a sensor hub) separate from the processor 2120. In the case that the separate processor (e.g., a sensor hub) is used, while the processor 2120 is in a sleep state, the separate processor may operate without awakening the processor 2120 to control at least a portion of the operation or the state of the sensor module 2176.

According to an embodiment of the disclosure, the interface 2177 may include a high definition multimedia interface (HDMI), a universal serial bus (USB), an optical interface, a recommended standard 232 (RS-232), a D-sub-miniature (D-sub), a mobile high-definition link (MHL) interface, a SD card/MMC (multi-media card) interface, or an audio interface. A connector 2178 may physically connect the electronic apparatus 2101 and the electronic apparatus 2106. According to an embodiment, the connector 2178 may include, for example, an USB connector, an SD card/MMC connector, or an audio connector (e.g., a headphone connector).

The haptic module 2179 may convert an electrical signal into mechanical stimulation (e.g., vibration or motion) or into electrical stimulation. For example, the haptic module 2179 may apply tactile or kinesthetic stimulation to a user. The haptic module 2179 may include, for example, a motor, a piezoelectric element, or an electric stimulator.

The camera module 2180 may capture, for example, a still image and a moving picture. According to an embodiment, the camera module 2180 may include at least one lens (e.g., a wide-angle lens and a telephoto lens, or a front lens and a rear lens), an image sensor, an image signal processor, or a flash (e.g., a light emitting diode or a xenon lamp).

The power management module 2188, which is to manage the power of the electronic apparatus 2101, may constitute at least a portion of a power management integrated circuit (PMIC).

The battery 2189 may include a primary cell, a secondary cell, or a fuel cell and may be recharged by an external power source to supply power at least one component of the electronic apparatus 2101.

The communication module 2190 may establish a communication channel between the electronic apparatus 2101 and an external apparatus (e.g., the first external electronic apparatus 2102, the second external electronic apparatus 2104, or the server 2108). The communication module 2190 may support wired communication or wireless communication through the established communication channel According to an embodiment, the communication module 2190 may include a wireless communication module 2192 or a wired communication module 2194. The communication module 2190 may communicate with the external apparatus through a first network 2198 (e.g. a wireless local area network such as Bluetooth or infrared data association (IrDA)) or a second network 2199 (e.g., a wireless wide area network such as a cellular network) through a relevant module among the wireless communication module 2192 or the wired communication module 2194.

The wireless communication module 2192 may support, for example, cellular communication, local wireless communication, global navigation satellite system (GNSS) communication. The cellular communication may include, for example, long-term evolution (LTE), LTE Advanced (LTE-A), code division multiple access (CDMA), wideband CDMA (WCDMA), universal mobile telecommunications system (UMTS), Wireless Broadband (WiBro), or Global System for Mobile Communications (GSM). The local wireless communication may include Wi-Fi, Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), beidou navigation satellite system (Beidou), the European global satellite-based navigation system (Galileo), or the like. In the disclosure, "GPS" and "GNSS" may be interchangeably used.

According to an embodiment, when the wireless communication module 2192 supports cellar communication, the wireless communication module 2192 may, for example, identify or authenticate the electronic apparatus 2101 within a communication network using the subscriber identification module (SIM) 2196. According to an embodiment, the wireless communication module 2192 may include a communication processor (CP) separate from the processor 2120 (e.g., an application processor (AP)). In this case, the communication processor may perform at least a portion of functions associated with at least one of components 2110 to 2196 of the electronic apparatus 2101 in substitute for the processor 2120 when the processor 2120 is in an inactive (sleep) state, and together with the processor 2120 when the processor 2120 is in an active state. According to an embodiment, the wireless communication module 2192 may include a plurality of communication modules, each supporting only a relevant communication scheme among cellular communication, local wireless communication, or a GNSS communication.

The wired communication module 2194 may include, for example, a local area network (LAN) service, a power line communication, or a plain old telephone service (POTS).

For example, the first network 2198 may employ, for example, Wi-Fi direct or Bluetooth for transmitting or receiving commands or data through wireless direct connection between the electronic apparatus 2101 and the first external electronic apparatus 2102. The second network 2199 may include a telecommunication network (e.g., a computer network such as a LAN or a wide area network (WAN), the Internet or a telephone network) for transmitting or receiving commands or data between the electronic apparatus 2101 and the second electronic apparatus 2104.

According to various embodiments, the commands or the data may be transmitted or received between the electronic apparatus 2101 and the second external electronic apparatus 2104 through the server 2108 connected with the second network 2199. Each of the first and second external electronic apparatuses 2102 and 2104 may be a device of which the type is different from or the same as that of the electronic apparatus 2101. According to various embodiments, all or a part of operations that the electronic apparatus 2101 will perform may be executed by another or a plurality of electronic apparatuses (e.g., the electronic apparatuses 2102 and 2104 or the server 2108). According to an embodiment, in the case that the electronic apparatus 2101 executes any function or service automatically or in response to a request, the electronic apparatus 2101 may not perform the function or the service internally, but may alternatively or additionally transmit requests for at least a part of a function associated with the electronic apparatus 2101 to any other device (e.g., the electronic apparatus 2102 or 2104 or the server 2108). The other electronic apparatus (e.g., the electronic apparatus 2102 or 2104 or the server 2108) may execute the requested function or additional function and may transmit the execution result to the electronic apparatus 2101. The electronic apparatus 2101 may provide the requested function or service using the received result or may additionally process the received result to provide the requested function or service. To this end, for example, cloud computing, distributed computing, or client-server computing may be used.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar components may be marked by similar reference numerals. The terms of a singular form may include plural forms unless otherwise specified. In the disclosure disclosed herein, the expressions "A or B", "at least one of A and/or B", "A, B, or C", or "at least one of A, B, and/or C", and the like used herein may include any and all combinations of one or more of the associated listed items. Expressions such as "first," or "second," and the like, may express their components regardless of their priority or importance and may be used to distinguish one component from another component but is not limited to these components. When an (e.g., first) component is referred to as being "(operatively or communicatively) coupled with/to" or "connected to" another (e.g., second) component, it may be directly coupled with/to or connected to the other component or an intervening component (e.g., a third component) may be present.

According to the situation, the expression "adapted to or configured to" used herein may be interchangeably used as, for example, the expression "suitable for," "having the capacity to," "changed to," "made to." "capable of" or "designed to" in hardware or software. The expression "a device configured to" may mean that the device is "capable of" operating together with another device or other parts. For example, a "processor configured to (or set to) perform A, B, and C" may mean a dedicated processor (e.g., an embedded processor) for performing corresponding operations or a generic-purpose processor (e.g., a central processing unit (CPU) or an application processor (AP)) which performs corresponding operations by executing one or more software programs which are stored in a memory device (e.g., the memory 2130).

The term "module" used herein may include a unit, which is implemented with hardware, software, or firmware, and may be interchangeably used with the terms "logic," "logical block," "part," "circuit," or the like. The "module" may be a minimum unit of an integrated part or a part thereof or may be a minimum unit for performing one or more functions or a part thereof. The "module" may be implemented mechanically or electronically and may include, for example, an application-specific integrated circuit (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media (e.g., the memory 2130) in the form of a program module. The instruction, when executed by a processor (e.g., the processor 2120), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a DVD, a magneto-optical media (e.g., a floptical disk)), an embedded memory, and the like. The one or more instructions may contain a code made by a compiler or a code executable by an interpreter.

Each component (e.g., a module or a program module) according to various embodiments may be composed of single entity or a plurality of entities, a part of the above-described sub-components may be omitted, or other sub-components may be further included. Alternatively or additionally, after being integrated in one entity, some components (e.g., a module or a program module) may identically or similarly perform the function executed by each corresponding component before integration. According to various embodiments, operations executed by modules, program modules, or other components may be executed by a successive method, a parallel method, a repeated method, or a heuristic method, or at least one part of operations may be executed in different sequences or omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic apparatus comprising:
a housing;
a touch screen display disposed inside the housing and exposed through a first portion of the housing;
a microphone disposed inside the housing and exposed through a second portion of the housing;
a communication circuit disposed inside the housing;
at least one processor disposed inside the housing and electrically connected to the touch screen display, the microphone, and the communication circuit; and
a memory disposed in the housing and electrically connected with the at least one processor,
wherein the memory stores an instruction that, when executed, causes the at least one processor to:
receive a user input through at least one of the touch screen display or the microphone, wherein the user input includes a request for performing a first task using a first external electronic apparatus and a second task dependent on the first task using a second external electronic apparatus,
transmit first data associated with the user input to an external server through the communication circuit,
receive a response including information about a first sequence of states for the first external electronic apparatus to perform the first task and a second sequence of states for the second external electronic apparatus to perform the second task, from the external server through the communication circuit,
transmit a first command that allows the first external electronic apparatus to have the first sequence of states to the first external electronic apparatus, and
transmit a second command that allows the second external electronic apparatus to have the second sequence of states to the second external electronic apparatus.

2. The electronic apparatus of claim 1,
wherein the first command includes the first sequence of states, and
wherein the second command includes the second sequence of states.

3. The electronic apparatus of claim 1, wherein the memory further stores an instruction that, when executed, further causes the at least one processor to:
obtain second data by allowing the first external electronic apparatus to have the first sequence of states based on the first command, and
when the second external electronic apparatus performs an operation based on the second sequence of states, transmit the second data together with the second command to the second external electronic apparatus to use the second data based on the second command.

4. The electronic apparatus of claim 3, wherein, when the first external electronic apparatus and the second external electronic apparatus are included in a local network, the first command allows the first external electronic apparatus to directly transmit the second data to the second external electronic apparatus.

5. The electronic apparatus of claim 1, wherein the memory further stores an instruction that, when executed, further causes the at least one processor to:
display the first sequence of states and the second sequence of states, which respectively operate based on the first command and the second command, in the touch screen display.

6. The electronic apparatus of claim 1, wherein the memory further stores an instruction that, when executed, further causes the at least one processor to:
when the first external electronic apparatus and the second external electronic apparatus complete an operation based on the first sequence of states and the second sequence of states, receive second information indicating that the operation has been completed from the first external electronic apparatus and the second external electronic apparatus.

7. The electronic apparatus of claim 6, wherein the response includes information about a state for verifying that the operation has been completed.

8. The electronic apparatus of claim 1, wherein the memory further stores an instruction that, when executed, further causes the at least one processor to:
determine whether a first operation of the second external electronic apparatus that is based on the second sequence of states is dependent on a second operation of the first external electronic apparatus that is based on the first sequence of states; and
when the first operation is dependent on the second operation, transmit the second command to the second external electronic apparatus after verifying that the second operation is completed.

9. A device for processing a user utterance, the device comprising:
a network interface;
at least one processor operatively connected to the network interface; and
at least one memory operatively connected to the at least one processor,
wherein the at least one memory stores an instruction that, when executed, causes the at least one processor to:
receive first data associated with a user input obtained through a microphone, from a first external electronic apparatus including the microphone through the network interface, wherein the user input includes a request for performing a first task using a second external electronic apparatus and a second task dependent on the first task using a third external electronic apparatus,
determine a first sequence of states for the second external electronic apparatus to perform the first task and a second sequence of states for the third external electronic apparatus to perform the second task, and
transmit a response including information about the first sequence of states and the second sequence of states to the first external electronic apparatus or an external server configured to control the second external electronic apparatus and the third external electronic apparatus, wherein the information includes a first command for having the first sequence of states for the second external electronic apparatus to perform the first task and a second command for having the second sequence of states for the third external electronic apparatus to perform the second task.

10. The device of claim 9,
wherein the first command includes the first sequence of states, and
wherein the second command includes the second sequence of states.

11. The device of claim 9, wherein the information includes a data packet including a header and a field indicating a plurality of commands.

12. The device of claim 9, wherein the first sequence of states and the second sequence of states are provided in a JavaScript object notation (JSON) format.

13. The device of claim 9, wherein the information includes a relationship between the first command and the second command.

14. The device of claim 9, wherein the first command includes a first device type associated with the second external electronic apparatus and a second device type associated with the third external electronic apparatus.

15. The device of claim 9, wherein the at least one memory stores an instruction that, when executed, further causes the at least one processor to:
when the first external electronic apparatus and one of the second external electronic apparatus or the third external electronic apparatus are not included in a local network, transmit the information to the external server.

16. The device of claim 9,
wherein the first command allows the second external electronic apparatus to have the second sequence of states to generate and transmit second data to the third external electronic apparatus, and
wherein the third external electronic apparatus performs an operation based on the second sequence of states using the second data.

17. The device of claim 16, wherein, when the second external electronic apparatus and the third external electronic apparatus are included in a local network, the first command allows the first external electronic apparatus to directly transmit the second data to the third external electronic apparatus.

18. A device for processing a user utterance, the device comprising:
a network interface;
at least one processor operatively connected to the network interface; and
at least one memory operatively connected to the at least one processor,
wherein the at least one memory stores an instruction that, when executed, causes the at least one processor to:
connect to a first Internet of things (IoT) device and a second IoT device through the network interface,
receive information about a first sequence of states of the first IoT device and a second sequence of states of the second IoT device, for performing at least one task, from an external server through the network interface, wherein the information includes a first command for the first IoT device and a second command for the second IoT device,
provide the first command to the first IoT device based at least partly on the first sequence of states, and provide the second command to the second IoT device based at least partly on the second sequence of states,
receive information about at least one state from at least one of the first IoT device or the second IoT device, and
after receiving an update of the at least one state, transmit the update of the at least one state to at least one of the external server or an external portable device through the network interface.

19. The device of claim 18, wherein the at least one memory stores an instruction that, when executed, further causes the at least one processor to:
provide the first command to the first IoT device,
after providing the first command, receive a first state update from the first IoT device,
after receiving the first state update, provide the second command to the second IoT device, and
after providing the second command, receive a second state update from the second IoT device.

20. The device of claim 18,
wherein the first command includes the first sequence of states, and
wherein the second command includes the second sequence of states.

* * * * *